United States Patent
Ngai et al.

(10) Patent No.: US 9,326,266 B2
(45) Date of Patent: Apr. 26, 2016

(54) METHODS AND APPARATUS TO DETERMINE A BASE STATION LOCATION

(71) Applicant: The Nielsen Company (US), LLC, New York, NY (US)

(72) Inventors: Dominic Ngai, Allen, TX (US); Sreenivas Sonnaila, Hyderabad (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/816,855

(22) Filed: Aug. 3, 2015

(65) Prior Publication Data

US 2015/0341896 A1 Nov. 26, 2015

Related U.S. Application Data

(63) Continuation of application No. 13/957,164, filed on Aug. 1, 2013, now Pat. No. 9,100,926.

(51) Int. Cl.
*H04W 24/00* (2009.01)
*H04W 64/00* (2009.01)
(Continued)

(52) U.S. Cl.
CPC .......... *H04W 64/003* (2013.01); *H04B 17/309* (2015.01); *H04W 84/042* (2013.01)

(58) Field of Classification Search
USPC ...................................................... 455/456.5
See application file for complete search history.

(56) References Cited

U.S. PATENT DOCUMENTS

| 5,493,286 A | 2/1996 | Grube et al. |
| 5,552,795 A | 9/1996 | Tayloe et al. |
| 6,101,175 A | 8/2000 | Schorman et al. |

(Continued)

FOREIGN PATENT DOCUMENTS

| EP | 0895435 | 2/1999 |
| EP | 1011283 | 6/2000 |

(Continued)

OTHER PUBLICATIONS

Geckobeach, "How to Interpret the Cellular/Movile Equipment Maps," Feb. 21, 2008, retrieved from <http://www.geckobeach.com/cellular/maps/mapfaqs.php>, retrieved on Feb. 21, 2008 (4 pages).

(Continued)

*Primary Examiner* — Joel Ajayi
(74) *Attorney, Agent, or Firm* — Hanley, Flight & Zimmerman, LLC

(57) ABSTRACT

Example methods and apparatus to determine a base station location are disclosed herein and include determining which signals are transmitted from a first base station by identifying a first set of signals having a first signal identifier, identifying a first signal in the first set of signals having a first relative highest signal quality value, identifying a first location associated with the first signal, identifying a second set of signals having a second signal identifier, identifying a second signal in the second set of signals having a second relative highest signal quality value, identifying a second location associated with the second signal, determining a first distance between the first location and the second location, comparing the first distance to a first threshold distance, associating the first signal and the second signal with the first base station when the first distance satisfies the first threshold distance, and estimating a location of the first base station based on at least one of the first location or the second location.

20 Claims, 25 Drawing Sheets

(51) Int. Cl.
*H04B 17/309* (2015.01)
*H04W 84/04* (2009.01)

(56) References Cited

U.S. PATENT DOCUMENTS

| | | |
|---|---|---|
| 6,628,953 B1 | 9/2003 | Dillon et al. |
| 6,717,547 B2 | 4/2004 | Spilker, Jr. et al. |
| 6,999,766 B1 | 2/2006 | Padovani |
| 7,127,257 B2 | 10/2006 | Riley et al. |
| 7,136,659 B2 | 11/2006 | Khushu et al. |
| 7,194,281 B2 | 3/2007 | Peng et al. |
| 7,203,510 B2 | 4/2007 | Tanoue |
| 7,409,214 B2 | 8/2008 | Lee |
| 7,463,895 B2 | 12/2008 | Shintai et al. |
| 7,546,111 B2 | 6/2009 | Nakano |
| 7,734,309 B2 | 6/2010 | Chi et al. |
| 7,751,833 B2 | 7/2010 | Mansour et al. |
| 7,885,239 B1 | 2/2011 | Oroskar et al. |
| 8,346,282 B1 | 1/2013 | Dronamraju et al. |
| 8,374,228 B2 | 2/2013 | Sanderford, Jr. et al. |
| 8,447,293 B2 | 5/2013 | Stapleton et al. |
| 9,100,926 B2 | 8/2015 | Ngai et al. |
| 2003/0235180 A1 | 12/2003 | Oprescu-Surcobe et al. |
| 2004/0202131 A1 | 10/2004 | An et al. |
| 2005/0043046 A1 | 2/2005 | Lee |
| 2005/0287954 A1 | 12/2005 | Lim et al. |
| 2006/0089153 A1 | 4/2006 | Sheynblat |
| 2006/0240840 A1* | 10/2006 | Morgan ............ G01S 5/02 455/456.1 |
| 2007/0058678 A1 | 3/2007 | Thompson, III et al. |
| 2007/0060084 A1 | 3/2007 | Thompson, III et al. |
| 2007/0243864 A1 | 10/2007 | Jaquet |
| 2012/0032819 A1 | 2/2012 | Chae et al. |
| 2012/0289269 A1 | 11/2012 | Kumagai |

FOREIGN PATENT DOCUMENTS

| | | |
|---|---|---|
| JP | H09312870 | 12/1997 |
| WO | 9853621 | 11/1998 |
| WO | 0205577 | 1/2002 |

OTHER PUBLICATIONS

Dolcera Wiki, "CDMA Basics," last modified Jul. 29, 2007, retrieved from <http://www.dolcera.com/wiki/index.php?title=CDMA,Basics>, retrieved on Feb. 21, 2008 (9 pages).

Google Inc., "Google Announces Launch of Google Maps for Mobile with "My Location" Technology," Nov. 28, 2007, retrieved from <http://www.google.com/intl/en/press/annc/20071128__maps__moble__my__...>, retrieved on Feb. 12, 2008 (1 page).

European Patent Office, "Extended Search Report," issued in connection with European Patent Application No. 09007946.8, mailed May 31, 2013 (7 pages).

United States Patent and Trademark Office, "Non-Final Office Action," issued in connection with U.S. Appl. No. 12/140,896, mailed Mar. 29, 2012 (6 pages).

United States Patent and Trademark Office, "Notice of Allowance," issued in connection with U.S. Appl. No. 12/140,896, mailed Jan. 22, 2013 (5 pages).

United States Patent and Trademark Office, "Notice of Allowance," issued in connection with U.S. Appl. No. 13/957,164, mailed Mar. 30, 2015 (14 pages).

* cited by examiner

| SUB GRID ID | GPS TIME | X COORD | Y COORD | SIGNAL ID | SIGNAL POWER | SIGNAL QUALITY | SIGNAL CATEGORY |
|---|---|---|---|---|---|---|---|
| | 22:39:08 | -97.37731 | 32.34176 | 3 | -73.5 | -0.57 | Active Set |
| | 19:29:46 | -97.37732 | 32.34186 | 3 | -64.9 | -7.85 | Active Set |
| | 21:55:59 | -97.37742 | 32.34186 | 3 | -81.3 | -1.05 | Active Set |
| | 23:04:21 | -97.37736 | 32.34169 | 3 | -74.6 | -0.38 | Active Set |
| | 16:33:36 | -97.37732 | 32.34186 | 3 | -73.5 | -7.05 | Neighbour Set |
| | 22:40:10 | -97.37732 | 32.34186 | 3 | -73.3 | -4.59 | Neighbour Set |
| | 23:04:00 | -97.89913 | 32.70038 | 3 | -86.3 | -4.42 | Neighbour Set |
| | 22:48:54 | -97.89923 | 32.70038 | 3 | -74.6 | -0.79 | Active Set |
| | 21:57:26 | -97.89956 | 32.70035 | 3 | -70.5 | -3.48 | Active Set |
| | 22:57:45 | -97.89913 | 32.70038 | 3 | -61.9 | -8.06 | Neighbour Set |
| | 18:26:01 | -97.89913 | 32.70038 | 3 | -81.3 | -5.63 | Neighbour Set |
| | 16:47:36 | -98.09793 | 33.13217 | 3 | -93.4 | -2.55 | Active Set |
| | 14:46:07 | -98.09706 | 33.13239 | 3 | -56.9 | -2.35 | Neighbour Set |
| | 14:32:35 | -98.09702 | 33.13264 | 3 | -63.3 | -7.34 | Active Set |

FIG. 4

METHODS AND APPARATUS TO DETERMINE A BASE STATION LOCATION

RELATED APPLICATION

This patent arises from a continuation of U.S. application Ser. No. 13/957,164, filed on Aug. 1, 2013, issued as U.S. Pat. No. 9,100,926, on Aug. 4, 2015, which is hereby incorporated herein by reference in its entirety.

FIELD OF THE DISCLOSURE

This disclosure relates generally to wireless networks, and, more particularly, to a method and apparatus to determine a location of a base station in a wireless network.

BACKGROUND

Wireless communication networks, such as cellular communication networks, include a plurality of base stations to facilitate communication between endpoints (e.g., cellular phones) or other network elements (e.g., base stations, gateways, etc.) of the network. The distribution of the base stations defines a coverage area of the wireless communication network of a wireless communication service provider (e.g., Verizon, AT&T, T-Mobile, etc.). The distribution of the base stations thereby affects a subscriber experience (e.g., quality of service, coverage, etc.) of the wireless network. For example, an adequate number of base stations distributed throughout an area generally provides seamless communication for subscribers. However, if the distribution of the base stations is inadequate, subscribers may experience poor signal quality, dropped calls, and/or may not be able to connect to the wireless network at all.

BRIEF DESCRIPTION OF THE DRAWINGS

FIG. 4 is an example data structure generated by the example signal receiver of FIG. 3.

DETAILED DESCRIPTION

Figure 1:
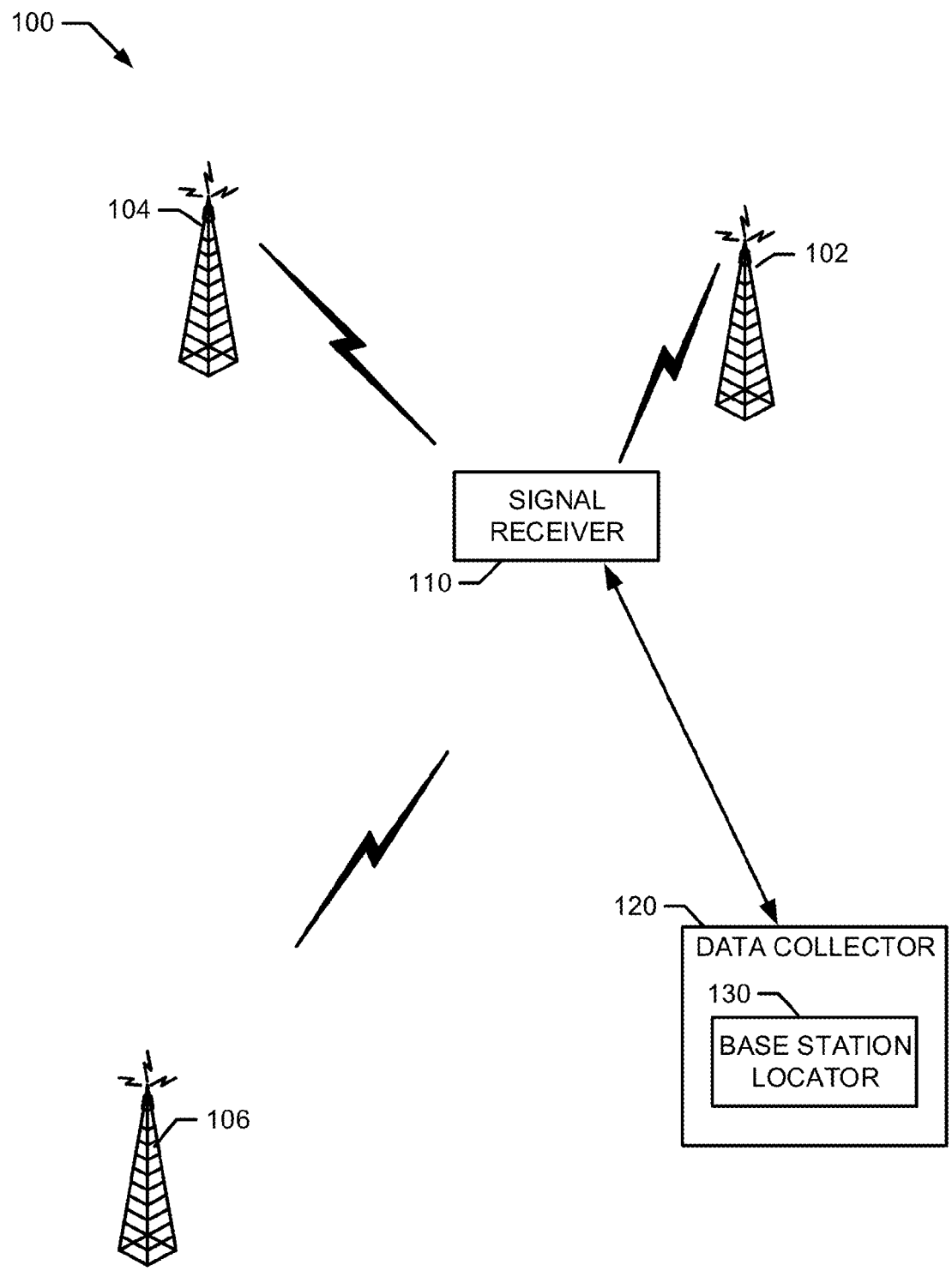
FIG. 1 illustrates an example environment including an example system constructed in accordance with the teachings of this disclosure for identifying the locations of base stations in the environment as disclosed herein.

Example methods, apparatus, and articles of manufacture disclosed herein identify which signals from a plurality of received signals are transmitted from the same base station using signal information broadcast from one or more transceivers of the base station. The example signal information may be received during a drive test performed to measure service details of wireless communication service providers. For example, on a drive test, a service measurement entity measures and records signal parameters associated with wireless signals, including a signal identification (signal ID) (e.g., a pseudo-noise (PN) code, a scrambling code (SC), or a physical cell identity (PCI)), a quality of service measurement, a signal strength measurement, etc. throughout one or more location(s) of an area to determine the overall service capabilities (e.g., quality, coverage, etc.) provided by a wireless communication service provider/mobile carrier (e.g., Verizon Wireless, AT&T, T-Mobile, etc.). The example service measurement entity may be an unbiased third party measurement entity, such as a media measurement entity, (e.g., the Nielsen Company (US)) that is not affiliated with a particular service provider and/or with provision of and/or delivery of network services. Accordingly, as a third-party entity, the service measurement entity would likely not have direct (e.g., as would be available to the service provider) access to specific information identifying which signals for a particular service provider are coming from which base station and/or specific location information of a base station (e.g., information such as Base Station No. 3 transmits Signal IDs 21502, 51703, and 61804, and is geographically located at 100° W, 30° N).

Example methods disclosed herein include identifying first signals comprising a same first signal identifier; identifying second signals comprising a same second signal identifier; identifying a first location associated with one of the first signals having a highest signal quality value and a second location associated with one of the second signals having a highest signal quality value; and determining that the first signals and the second signals are transmitted from a first base station if a distance between the first location and the second location satisfies a threshold. Additionally, disclosed example methods include determining that the first signals and the second signals are transmitted from a same base station in a same area based on a threshold distance between the first location and the second location. In some examples, disclosed methods herein include determining first signals and second signals were transmitted in a same area based on the first signals referencing the second signals and the second signals referencing the first signals. In some examples, a physical location of the base station (i.e., a geographic location) is determined based on the first location and the second location. As used herein, "base station location" and "location of a/the base station" refer to the physical location of the base station (e.g., the geographic location).

In some examples disclosed herein, received signal information is stored in signal records in a signal record database. The signal records may be aggregated (e.g., combined) based on a sub-grid location of where the signals were received. In some examples, signal records having the same signal ID are differentiated from one another based on a distance between where the signals were received (e.g., using a 5 kilometer threshold) to account for reuse of the same signal ID (e.g., two or more base stations each transmitting a signal having the same signal ID). In some such examples, the aggregation and differentiation of the signal records provides sample location points (e.g., the first and second location described above) based on signal quality and/or signal strength values that may be used to determine whether signals are transmitted from a same base station and/or to calculate a location of a base station.

In some example methods, apparatus, and articles of manufacture disclosed herein, a receiver and/or data collector generate(s) correlation records identifying signal information retrieved in an area. For example, a receiver may record which signals were used to communicate with a base station (e.g., active signals) and which signals were available for future communication with a base station (e.g., neighbor signals). Accordingly, signal records disclosed herein may identify that the signals are associated with a type (e.g., an active signal type, a neighbor signal type, etc.). For example, a signal may be an active signal when a receiver is communicatively coupled and/or registered with a transceiver of a base station using the signal ID. A signal may be considered a neighbor signal when the signal is a candidate signal for a handoff to enable the receiver to communicate with another transceiver of the same base station and/or another base station. A neighbor signal may be identified via signal parameter messages transmitted via active signals. In some examples, neighbor signals can be identified directly from transmissions of the base stations (e.g., via a beacon, via a communication session initiation message, etc.), but the neighbor signal remains a neighbor signal until the receiver begins communicating with the base station using the neighbor signal. A handoff occurs when a receiver switches communication with one transceiver of a base station to another transceiver of the same base station and/or to a transceiver of another (i.e., different) base station (e.g., a base station of an adjacent cell). Accordingly, signals may be correlated if they were active and/or neighbor signals received, measured, and/or captured by a receiver at the same time and/or location.

FIG. 1 illustrates an example environment 100 including an example system constructed in accordance with the teachings of this disclosure for identifying the physical base station locations of example base stations 102, 104, 106 in the environment 100 as disclosed herein. The example system includes an example signal receiver 110 and an example data collector 120. The example data collector 120 of FIG. 1 includes an example base station locator 130. In some examples, the base station locator 130 is located within the signal receiver 110 or is separate from the signal receiver 110 and/or the data collector 120. In some examples, the data collector 120 is a central data facility (e.g., a data facility associated with a service measurement entity) for processing data generated by the signal receiver 110.

Figure 2:
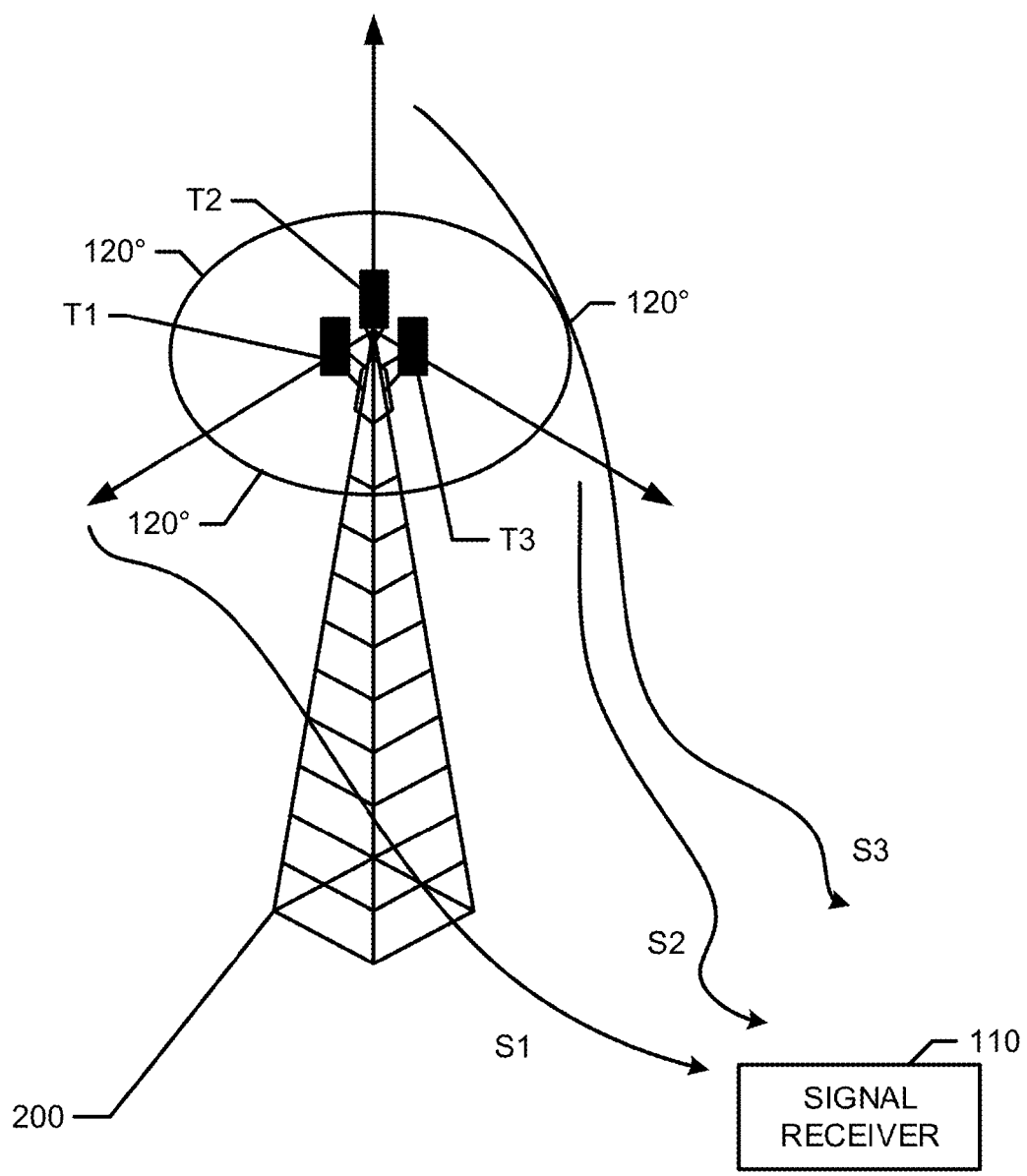
FIG. 2 is an illustration of an example base station that may be identified using the methods and apparatus disclosed herein.

In the illustrated example of FIG. 1, the signal receiver 110 is transported (e.g., on a drive test by a person, by a vehicle, etc.) and takes signal measurements of signals transmitted from the base station(s) 102, 104, 106 throughout the environment 100. The base station(s) 102, 104, 106 may transmit a plurality of signals over a period of time (e.g., a day, a week, a year, etc.) that are received, measured, and/or recorded by the signal receiver 110. An example base station 200, which may implement any or all of the base stations 102, 104, 106, is illustrated in FIG. 2. The example base station 200 of FIG. 2 includes three transceivers T1, T2, T3 that directionally transmit signals S1, S2, S3 at 120° angles from one another, respectively. As defined herein, a transceiver (e.g., the transceivers T1, T2, T3) of a base station may include both a receiver and a transmitter. Accordingly, a cell of the base station 200 is divided into three sectors corresponding to the three signals S1, S2, S3. As used herein, the cell of a base station is defined to be an area bounded by the range of the signals S1, S2, S3 transmitted from the base station.

In some examples, some or all of the signals S1, S2, S3 of FIG. 2 may reach the signal receiver 110 of FIG. 1. The signals S1, S2, S3 may each take more than one path to reach the signal receiver 110 (e.g., by reflecting off terrestrial bodies, by refraction, etc.). This phenomenon is commonly known as multipath. Accordingly, despite the signals S1, S2, S3 being directionally transmitted from the respective transceivers T1, T2, T3, the signals S1, S2, S3 may be received at the same location of the signal receiver 110. For example, due to the multipath phenomenon, at least one of the paths taken by at least one of the signals S1, S2, S3 may result in each of the signals S1, S2, S3 reaching the signal receiver 110. In some examples, although the signal receiver 110 receives all of the signals S1, S2, S3 from the transceivers T1, T2, T3, the signal receiver may only be communicatively coupled to a first transceiver T1 using a first signal S1, such as by registering with a first transceiver T1 to establish a communication session with the first transceiver T1. In such an example, the first signal S1 is considered an active signal, and the second and third signals S2, S3 are considered neighbor signals.

The signal receiver 110 of the illustrated example receives one or more signals having different signal IDs from each of the base stations 102, 104, 106. The signal receiver 110 of the illustrated example records signal parameters (e.g., signal identification, service provider information, etc.) and/or signal metrics values (e.g., quality of service, signal strength, signal type) of the signals received from the base stations 102, 104, 106. The signal receiver 110 of the illustrated example determines the type (e.g., an active signal, a neighbor signal, etc.) of signal that is received from the base stations 102, 104, 106. For example, a received signal may be an active signal or a neighbor signal. As used herein, an active signal is defined to be a signal that a receiver uses to actively communicate (e.g., the signal receiver 110 is registered with a first transceiver T1 of the base station 200 for transmitting content, such as voice or data) with one of the base stations 102, 104, 106. As used herein, a neighbor signal is defined to be a candidate signal that is not currently intended for communicating with a given receiver but may be used in the future (e.g., after a handoff) by the receiver (e.g., the signal receiver 110) to communicate with another transceiver of a base station transmitting the active signal or with another transceiver of another base station. For example, if the signal receiver 110 of FIG. 2 is registered with the first transceiver T1, the first signal S1 is an active signal, and, if the signal receiver 110 receives the second and third signals S2, S3 but is not registered with the second and third transceivers T2, T3, then the second and third signals S2, S3 are identified as neighbor signals. In another example, the signal receiver 110 may be registered with more than one transceiver (from the same base station or another base station). Accordingly, in such an example, the first and second signals S1, S2 from the first and second transceivers T1, T2 are active signals while the third signal S3 is a neighbor signal from the third transceiver T3. In some examples, signal parameter messages transmitted via an active signal to a receiver (e.g., the signal receiver 110) provide signal type information representative of neighbor signals in an area of the base station (e.g., one of the base stations 102, 104, 106) transmitting the active signal.

In the illustrated example of FIG. 1, the signal receiver 110 is mobile (e.g., ambulatory). Thus the signal receiver 110 also records location information indicating where the signal receiver 110 is located when the signals from one or more base stations (e.g., the base stations 102, 104, 106) are received. After receiving, measuring, and recording signals in the environment 100 (e.g., after a drive test), the example signal receiver 110 forwards (e.g., via a wireless connection (e.g., a cellular network, Wi-Fi, Bluetooth™, etc.), via a wired connection (e.g., Universal Serial Bus (USB), serial, Ethernet line, etc.), and/or via a network (e.g., the Internet)) the recorded information to the data collector 120 for processing and/or storage. The example base station locator 130 of FIG. 1 analyzes the received signal data and estimates or calculates the base station location of the base stations 102, 104, 106, as disclosed in further detail below. In some examples, the base station locator 130 uses signal data that was received and/or otherwise retrieved on a plurality of drive tests from one or more signal receivers 110.

Figure 3:
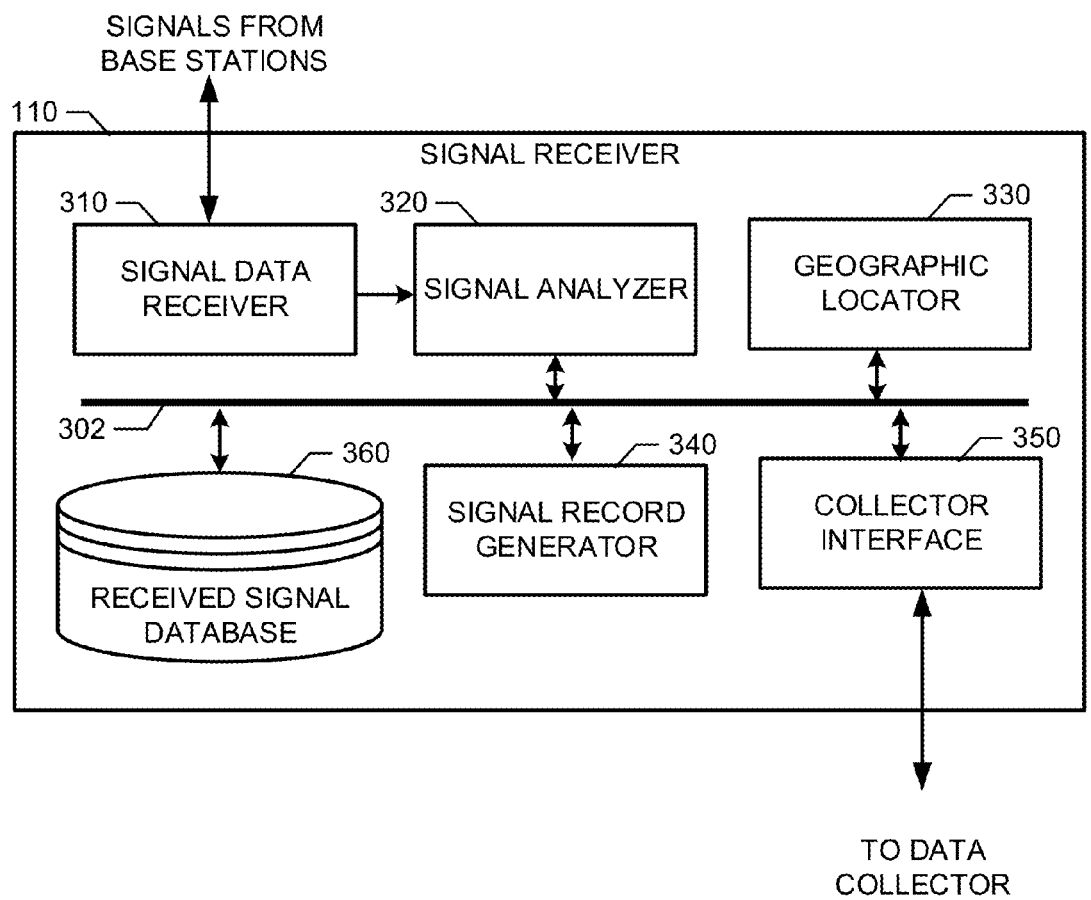
FIG. 3 is a block diagram of an example implementation of the example signal receiver of the example system of FIG. 1.

FIG. 3 is a block diagram of an example implementation of the example signal receiver 110 of FIG. 1. The example receiver 110 includes an example receiver bus 302 to facilitate communication between an example signal data receiver 310, an example signal analyzer 320, an example geographic locator 330, an example signal record generator 340, an example collector interface 350, and an example received signal database 360.

In the illustrated example of FIG. 3, the signal data receiver 310 receives signals from the base stations 102, 104, 106 and forwards the signals to the signal analyzer 320. The example signal analyzer 320 determines (e.g., identifies and extracts, parses, etc.) the signal parameters (e.g., signal ID and/or signal category (e.g., active, neighbor, etc.)) and signal metrics of the signal (e.g., signal strength values and/or signal quality values). In some examples, the signal analyzer 320 identifies a signal category (e.g., active, neighbor, etc.) for the received signals and/or signal IDs for other signals in the area (e.g., neighbor signal information included in messages sent via the active signal).

The example signal analyzer 320 of FIG. 3 determines the above signal parameter information by decoding radio parameter information from system messages. For example, for enhanced voice-data optimized (EVDO) technology, the signal ID is a PN code, the signal power is energy (E), the signal quality is a signal to interference ratio (e.g., energy/interference (E/I)), and the signal category is "Active" or "Neighbor." As another example, for high speed packet access (HSPA) technology, the signal ID is a SC, the signal power is the received signal code power (RSCP), the signal quality is the received signal received quality (RSRQ), and the signal category is "Active" or "Neighbor." In still another example, for long term evolution (LTE) technology, the signal ID is a PCI, and correlations between signals are made based on a portion of the PCI and/or reuse location information. The portion of the PCI may represent a unique cell ID of the network. The example signal analyzer 320 forwards the signal information to the signal record generator 340 to generate a signal record (see FIG. 4) for the received signal. In some examples, the signal analyzer 320 identifies active lists and/or neighbor lists in the messages. The lists collectively identify an active signal and potential neighbor signals of the active signals.

FIG. 4 illustrates an example data structure 400 including example signal records 402, generated by the signal record generator 340. Each of the signal records 402 may be identified by a unique record identification (record ID). The example data structure 400 of FIG. 4 corresponds to a portion of signal records stored in the received signal database 360. The signal record generator 340 of the illustrated example stores time information 410 and location information 420 received from the geographic locator 330. In the illustrated example, the geographic locator 330 is implemented by a global positioning system (GPS) receiver, which operates to generate signals that identify when and where the signal was received by the example signal receiver 110. The signal records 402 also include a signal ID 430 (e.g., a PN code, a SC code, a PCI, etc.), a signal strength measurement 440, a signal quality measurement 450, and signal type information 460. The signal type information 460 identifies whether the signal record for the listed signal ID (e.g., signal ID "3") was an active signal or a neighbor signal. In some examples, additionally or as an alternative to the signal type information 460 identifying the type of signal, the signal records 402 include correlated signal information (e.g., signal IDs) identifying signals that were active, neighbors, and/or listed as a neighbor signal at the time of the corresponding record (e.g., see correlated signals 1106 of FIG. 11).

The received signal database 360 of the example illustrated in FIG. 3 stores the signal records 402 generated by the signal record generator 340. The example collector interface 350 outputs the signal records 402 to the data collector 120 upon completion of receiving signals (e.g., following a drive test).

While an example manner of implementing the signal receiver 110 of FIG. 1 is illustrated in FIG. 3 one or more of the elements, processes and/or devices illustrated in FIG. 3 may be combined, divided, re-arranged, omitted, eliminated and/or implemented in any other way. Further, the example signal data receiver 310, the example signal analyzer 320, the example geographic locator 330, the example signal record generator 340, the example collector interface 350, the example received signal database 360 and/or, more generally, the example signal data receiver 110 of FIG. 3 may be implemented by hardware, software, firmware and/or any combination of hardware, software and/or firmware. Thus, for example, any of the example signal data receiver 310, the example signal analyzer 320, the example geographic locator 330, the example signal record generator 340, the example collector interface 350, the example received signal database 360 and/or, more generally, the example signal data receiver 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal data receiver 310, the example signal analyzer 320, the example geographic locator 330, the example signal record generator 340, the example collector interface 350, and/or the example received signal database 360 is/are hereby expressly defined to include a tangible computer readable storage device or storage disk such as a memory, a digital versatile disk (DVD), a compact disk (CD), a Blu-ray disk, etc. storing the software and/or firmware. Further still, the example signal receiver 110 of FIG. 1 may include one or more elements, processes and/or devices in addition to, or instead of, those illustrated in FIG. 3, and/or may include more than one of any or all of the illustrated elements, processes and devices.

Figure 5:
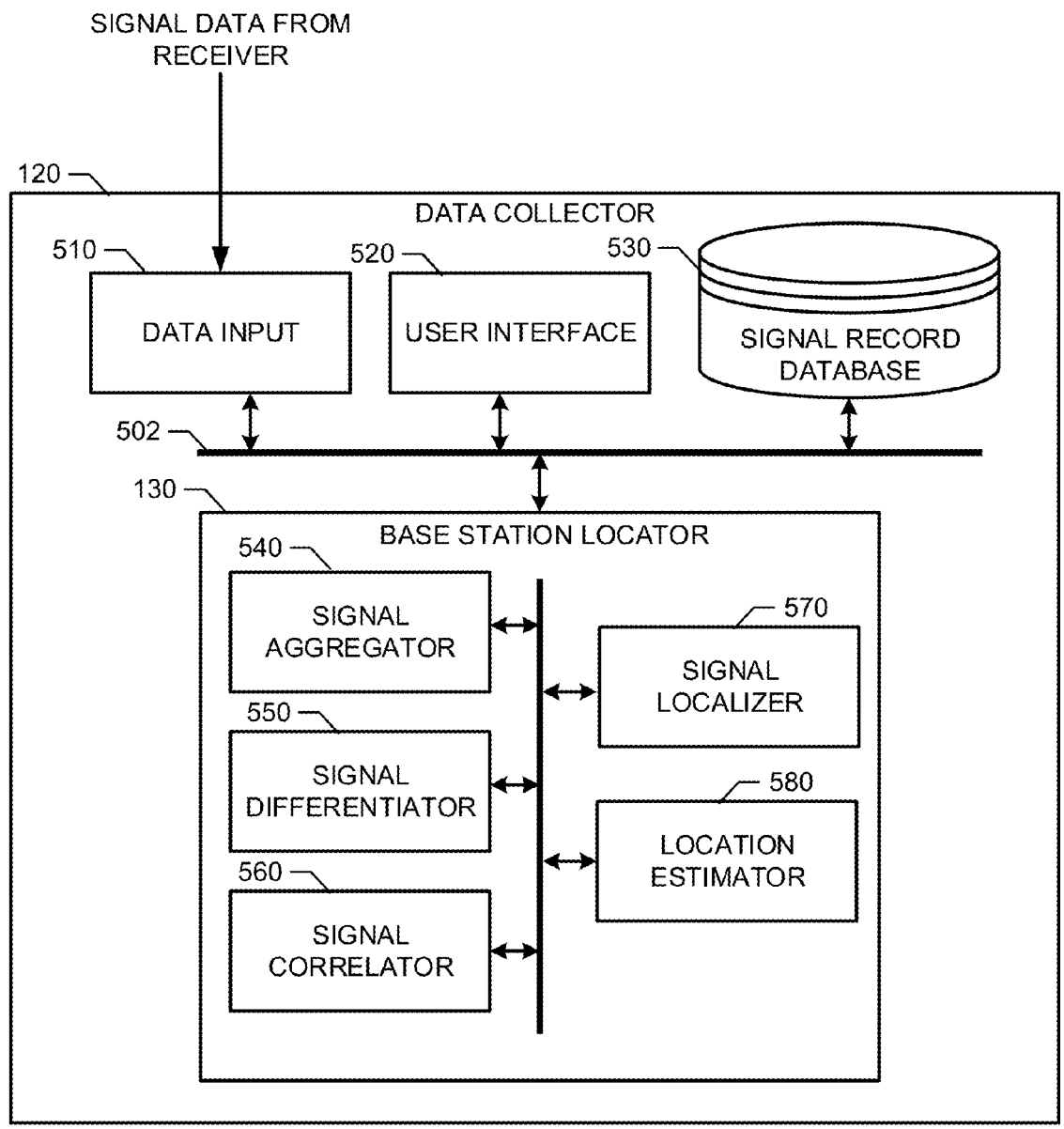
FIG. 5 is a block diagram of an example implementation of the example data collector of FIG. 1 constructed in accordance with the teachings of this disclosure.

FIG. 5 is a block diagram of an example implementation of the example data collector 120 of FIG. 1. The example data collector 120 of FIG. 5 includes an example communication bus 502 to facilitate communication between an example data input 510, an example user interface 520, an example signal record database 530, and the example base station locator 130 of FIG. 1. The base station locator 130 of FIG. 5 includes an example signal aggregator 540, an example signal differentiator 550, an example signal correlator 560, an example signal localizer 570, and an example base station location estimator 580.

The example data input 510 of FIG. 5 receives signal data records from the signal receiver 110 via a wireless connection, wired connection, and/or over a network (e.g., uploaded via the Internet or other network). The example data input 510 forwards the received signal records (e.g., the records 402 of FIG. 4) to the signal record database 530. The example user interface 520 enables a user to interact with the signal records of the signal record database 530. In some examples, the user interface 520 is used to adjust settings (e.g., threshold values) of the base station locator 130.

The example base station locator 130 of FIG. 5 estimates the location of one or more base stations (e.g., the base stations 102, 104, 106 of FIG. 1) using information in the signal records (e.g., the signal records 402) stored in the signal record database 530.

The example signal aggregator 540 of the base station locator 130 of FIG. 5, as further described below with respect to FIGS. 6 and 7, aggregates signal records having the same signal ID and location information indicating receipt of signals (and/or retrieval of signal parameters) within sub-grids (e.g., 100 m×100 m square sub-grids of a grid graph plotted over the area of the drive test). If the signals were received within the same sub-grids of the same grid and have the same signal ID, the signal aggregator 540 aggregates signal records for the signals into a single aggregated signal record. In the illustrated example, the signal aggregator 540 calculates aggregated signal metrics for use in estimating and/or calculating the location of the base stations.

The example signal differentiator 550 of FIG. 5, as further described below with respect to FIGS. 8 and 9, differentiates signal records (e.g., signal records aggregated by the example signal aggregator 540) having the same signal ID from each other based on a threshold reuse distance (e.g., 5 kilometers) between the sub-grid locations identified in the aggregated records of the signal ID. The signal differentiator 550 accounts for multiple base stations using the same signal ID (e.g., signal reuse). Accordingly, if multiple base stations are using the same signal ID, the signal differentiator 550 determines that the signal records are coming from different base stations by determining that signals represented by the signal records were received at least the threshold reuse distance apart, and thus could not have been transmitted from the same base station. Furthermore, as described below, the signal differentiator 550 determines a sample location point used to determine the location of one or more base stations by identifying the greatest signal quality value (e.g., as determined from a threshold, as determined from a relative comparison between retrieved signals, etc.) measured for the particular signal IDs in a particular area (e.g., corresponding to assigned reuse regions).

The example signal correlator 560, as further described below with respect to FIGS. 10 and 11, identifies signals that are correlated based on when and/or where the signals were received using correlation records in the signal record database 530. For example, the signal correlator 560 determines that two or more signals were either identified as an active signal, a neighbor signal, or other type of signal at a certain receipt (or retrieval) time and location. The signal correlator 560 determines likelihood that the signals are being transmitted from one or more base stations in a certain area (e.g., one or more cells of an area tested in a drive test).

The example signal localizer 570, as further described below with respect to FIGS. 12 and 13, determines whether signals received (or captured) are transmitted from the same base station using information from the signal differentiator 550 and the signal correlator 560. For example, the signal localizer 570 determines whether correlated signals identified by the signal correlator 560 are transmitted from the same base station using location information (e.g., a location corresponding to the greatest signal quality value for a particular signal in a particular area (e.g., a reuse area determined by the signal differentiator 550)) for the corresponding signal IDs from records generated by the signal differentiator 550. For example, if the locations where the greatest signal quality value was received for each of the correlated signals is within a threshold distance (e.g., 100 meters, 300 meters, etc.), then a determination can be made that the signals were transmitted from the same base station. In some examples, the threshold distance is a user defined parameter.

The example base station location estimator 580, as further described below with respect to FIGS. 14-16, estimates a base station location based on information received from the signal localizer 570. For example, the base station location estimator 580 calculates the base station location based on the location information from the signal records identifying location(s) where a greatest signal quality measurement value from the base station identified by the signal localizer 570 were received.

While an example manner of implementing the data collector 120, including the base station locator 130, of FIG. 1 is illustrated in FIG. 5 one or more of the elements, processes and/or devices illustrated in FIG. 5 may be combined, divided, re-arranged, omitted, eliminated and/or implemented in any other way. Further, the example data input 510, the example user interface 520, the example signal record database 530, the base station collector 130, including the example signal aggregator 540, the example signal differentiator 550, the example signal correlator 560, the example signal localizer 570, and the base station location estimator 580 and/or, more generally, the example data collector 120 of FIG. 5 may be implemented by hardware, software, firmware and/or any combination of hardware, software and/or firmware. Thus, for example, any of the example data input 510, the example user interface 520, the example signal record database 530, the base station collector 130, including the example signal aggregator 540, the example signal differentiator 550, the example signal correlator 560, the example signal localizer 570, and the base station location estimator 580, and/or, more generally, the example data collector 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data input 510, the example user interface 520, the example signal record database 530, and/or the base station collector 130, including the example signal aggregator 540, the example signal differentiator 550, the example signal correlator 560, the example signal localizer 570, and the base station location estimator 580 is/are hereby expressly defined to include a tangible computer readable storage device or storage disk such as a memory, a digital versatile disk (DVD), a compact disk (CD), a Blu-ray disk, etc. storing the software and/or firmware. Further still, the example data collector 120, including the base station locator 130, of FIG. 1 may include one or more elements, processes and/or devices in addition to, or instead of, those illustrated in FIG. 5, and/or may include more than one of any or all of the illustrated elements, processes and devices.

Figure 6:
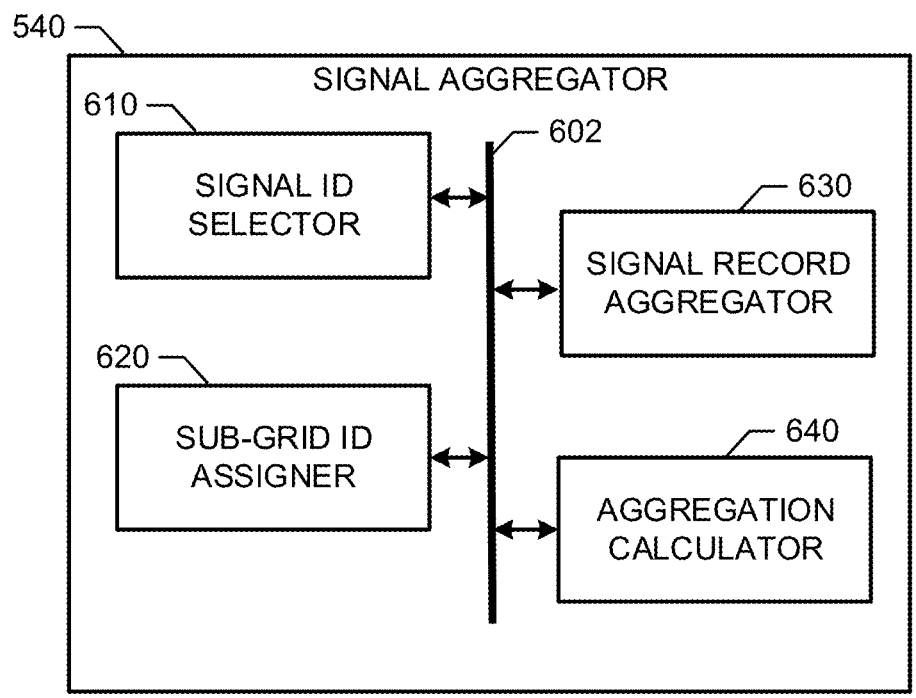
FIG. 6 is a block diagram of an example implementation of the example signal aggregator of FIG. 5.
Figure 7:
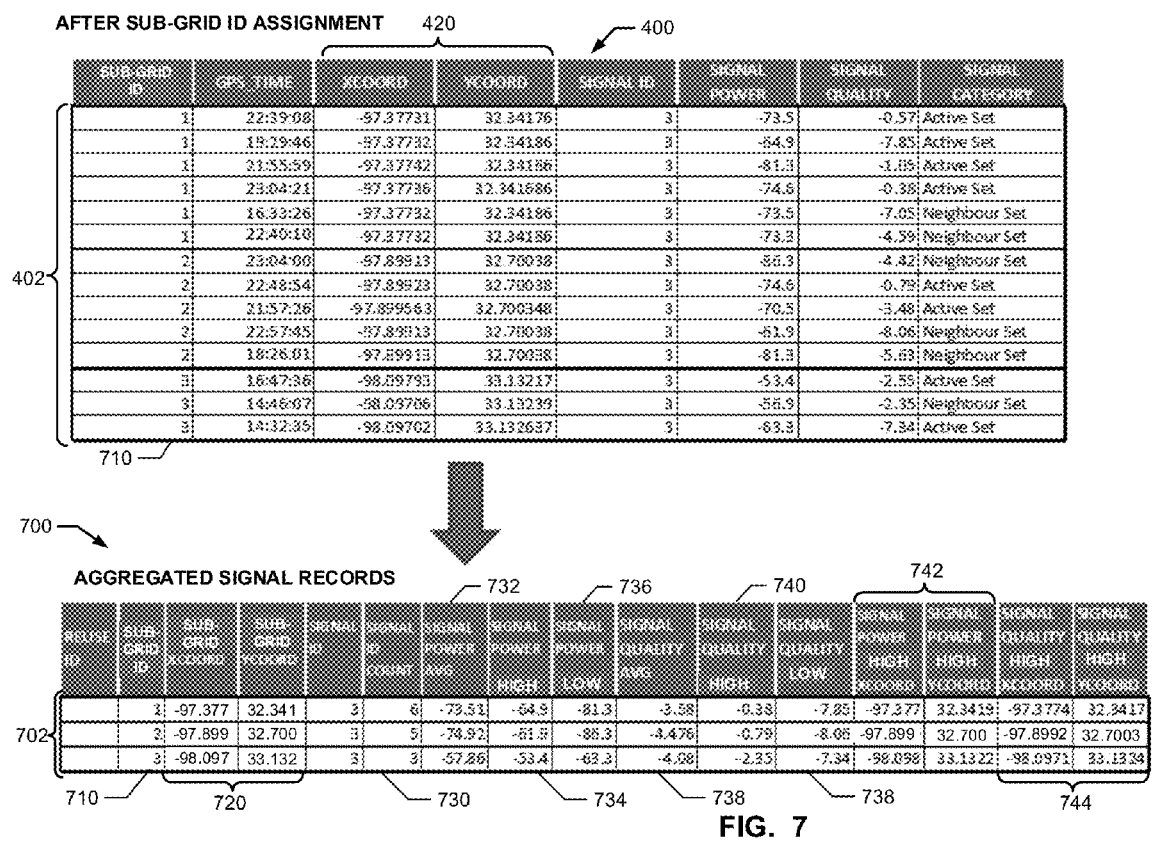
FIG. 7 illustrates an example data structure generated by the example signal aggregator of FIG. 6.

FIG. 6 illustrates an example implementation of the example signal aggregator 540 of FIG. 5. The example signal aggregator 540 of FIG. 6 identifies a plurality of signal records representative of signals that were received, captured, and/or measured at or near the same location (e.g., within a same sub-grid of the same grid) over a period of time (e.g., a signal was received more than once on a drive test at or near the same location, or a signal was received during a first drive test and later received at or near the same location on a second drive test). Using the signal IDs from the signal records and location information, the signal aggregator 540 combines those records into a single aggregated record for each sub-grid of a grid plotted over an area (e.g., a city, a metropolitan area, a region of interest, etc.). The signal aggregator 540 includes a communication bus 602 that facilitates communication between an example signal ID selector 610, an example sub-grid identification (sub-grid ID) assigner 620, an example signal record aggregator 630, and/or an example aggregation calculator 640. The signal aggregator 540 of the illustrated example aggregates the signal records 402 from the data structure 400 into aggregated signal records 702 in the example data structure 700 of FIG. 7.

In the illustrated example of FIG. 6, the signal aggregator 540 receives and/or retrieves signal records (e.g., including the signal records 402) from the signal record database 530. The example signal ID selector 610 selects a signal ID (e.g., signal ID "3" in FIG. 7) to aggregate signal records from the signal record database 530 having the same signal ID and the same or similar measurement location (e.g., within a sub-grid and/or grid). In the illustrated example of FIG. 7, the signal records 402 may be a portion of the signal records in the signal record database 530 having a signal ID of "3" that are to be aggregated.

The example sub-grid ID assigner 620 identifies location information 420 for the selected signal records 402 and determines an area in which the signals were received. The sub-grid ID assigner 620 plots a grid (e.g., a mesh graph, a lattice graph, etc.) over an area defined by the location coordinates of the location information 420 to divide the area into a plurality of sub-grids or cells. For example, the grid may include a plurality of 100 meter by 100 meter square sub-grids (or other shaped/sized sub-grids or cells) covering an area (e.g., a metropolitan area, a city, a region, etc.) tested on a drive test. The term "sub-grid" will be used herein to refer to a sub-region of a grid as opposed to "cell" to avoid confusion with the cell of a base station. The sub-grid ID assigner 620 then assigns the same sub-grid ID 710 (e.g., sub-grid ID "1", "2", or "3") to the signal records 402 indicating that the signals were received within that particular sub-grid. Accordingly, in the example data structure 400, the signal records 402 identify signals having a signal ID of "3" and were received in three sub-grids assigned sub-grid IDs 1, 2, 3.

The example signal record aggregator 630 of FIG. 6 identifies which of the signal records 402 have the same signal ID and sub-grid ID. The signal record aggregator 630 combines the signal records 402 having the same sub-grid ID and the same signal ID into a single record as illustrated in the data structure 700 to generate the aggregated signal records 702 of FIG. 7.

The example aggregation calculator 640 of FIG. 6 calculates aggregation measurements for the aggregated signal records 702 from the signal records 402. The aggregation measurements may include statistical distributions (e.g., highest/greatest, lowest/least, averages, etc.) of the signal ID and sub-grid ID based on the number of signal records 402 having the same sub-grid ID and the same signal ID, represented in example aggregation measurements 720-744. For example, the aggregation calculator 640 identifies the location associated with greatest (or highest) signal quality values 740 for each sub-grid ID 710 of the signal records 402. Furthermore, the aggregation calculator 640 also determines the relative greatest signal quality location of information 744 of the corresponding signal records 402 and records the information in the aggregated signal records 702. The aggregated signal records 702 may then be stored by the signal aggregator 540 in the signal record database 530 and/or at another storage location accessible by the base station locator 130.

While an example manner of implementing the signal aggregator 540 of FIG. 5 is illustrated in FIG. 6 one or more of the elements, processes and/or devices illustrated in FIG. 6 may be combined, divided, re-arranged, omitted, eliminated and/or implemented in any other way. Further, the example signal ID aggregator 610, the example sub-grid ID assigner 620, the example signal record aggregator 630, the example aggregation calculator 640 and/or, more generally, the example signal aggregator 540 of FIG. 6 may be implemented by hardware, software, firmware and/or any combination of hardware, software and/or firmware. Thus, for example, any of the example signal ID aggregator 610, the example sub-grid ID assigner 620, the example signal record aggregator 630, the example aggregation calculator 640 and/or, more generally, the example signal aggregator 540 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal ID aggregator 610, the example sub-grid ID assigner 620, the example signal record aggregator 630, and/or the example aggregation calculator 640 is/are hereby expressly defined to include a tangible computer readable storage device or storage disk such as a memory, a digital versatile disk (DVD), a compact disk (CD), a Blu-ray disk, etc. storing the software and/or firmware. Further still, the example signal aggregator 540 of FIG. 5 may include one or more elements, processes and/or devices in addition to, or instead of, those illustrated in FIG. 6, and/or may include more than one of any or all of the illustrated elements, processes and devices.

Figure 8:
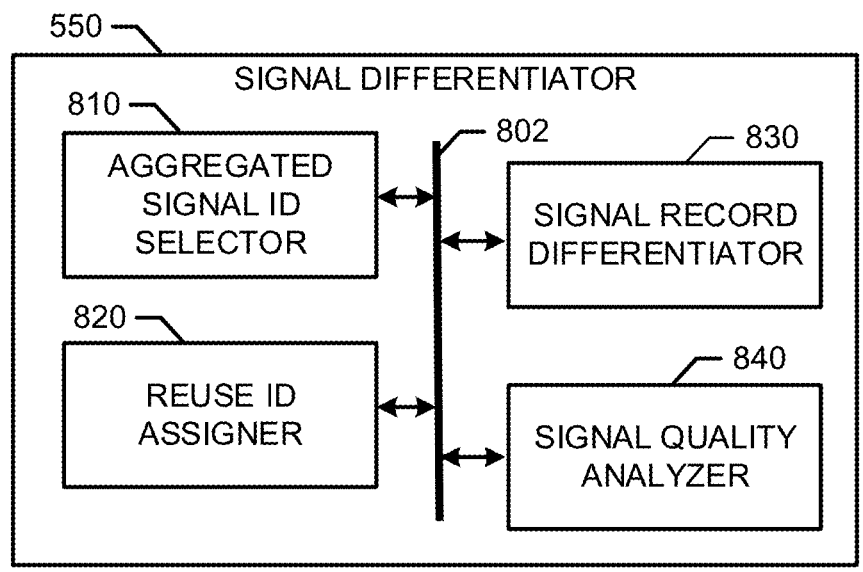
FIG. 8 is a block diagram of an example implementation of the example signal differentiator of FIG. 5.
Figure 9:
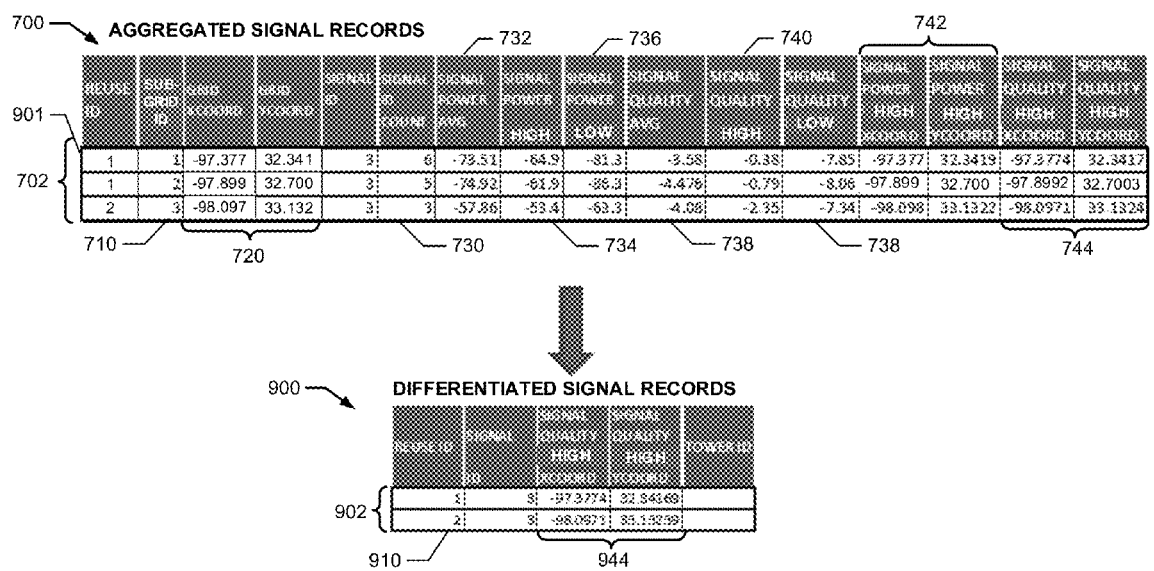
FIG. 9 illustrates an example data structure generated by the example signal differentiator of FIG. 8.

FIG. 8 illustrates an example implementation of the example signal differentiator 550 of FIG. 5. The signal differentiator 550 identifies geographic locations where a signal ID (e.g., signal ID "3") is being reused by one or more base stations. The signal differentiator 550 includes a communication bus 802 to facilitate communication between an example aggregated signal ID selector 810, an example reuse ID assigner 820, an example signal record differentiator 830, and an example signal quality analyzer 840. The example signal differentiator 550 of FIG. 8 differentiates the aggregated signal records 702 from the data structure 700 into differentiated signal records 902 of the data structure 900 of FIG. 9.

In the illustrated example of FIG. 8, the signal differentiator 550 retrieves aggregated signal records 702. For example, the example aggregated signal ID selector 810 selects aggregated signal records 702 having the same signal ID (e.g., signal ID "3" in FIG. 9) to differentiate the aggregated signal records in the signal record database 530. In the example of FIG. 9, the aggregated signal records 702 may be a portion of the aggregated signal records in the signal record database 530 (e.g., the records having a signal ID of "3") that are to be differentiated.

The example reuse ID assigner 820 of FIG. 8 identifies sub-grid location information 720 for the aggregated signal records 702 having the same signal ID (e.g., signal ID "3"). The reuse ID assigner 820 calculates an inter sub-grid distance between each of the identified sub-grid locations 720. For example, the reuse ID assigner 820 of the illustrated example calculates a distance between a first sub-grid location of a first aggregated signal record and a second sub-grid location corresponding to a second aggregated signal record, a distance between the first sub-grid location and a third sub-grid location of a third aggregated signal record, etc. A unique reuse ID 910 (e.g., reuse ID "1" or "2") is assigned to the aggregated signal records 702 having sub-grid location information within a threshold reuse distance (e.g., 5 kilometers) to generate the differentiated signal records 902. Accordingly, in the example data structure 700, the aggregated signal records 702 identify signals having a signal ID of "3" corresponding to two separate reuse regions represented by reuse IDs 910. Because of the threshold distance identified above, in the illustrated example, a reuse region of interest represented by reuse ID "1" is at least a reuse threshold distance (e.g., 5 miles) from a second reuse region represented by reuse ID "2" in FIG. 9. As such, the reuse ID assigner 820 enables the signal differentiator 550 to determine that a signal record assigned to reuse ID "2" must not have been transmitted from a base station at a reuse region of interest represented by reuse ID "1" despite having the same signal ID.

In some examples, the assigned reuse ID 910 may be unique to a specific area (e.g., an area surrounding the location identified by location information 720), such that the same reuse ID may be assigned to other signal records for other signal IDs (e.g., a sample signal record with a signal ID of "6" may also be assigned a reuse ID of "1" based on the location of the sample signal record information). For example, the signal differentiator 550 may also use and/or update a reuse region table, identifying locations and/or regions assigned to respective reuse IDs. In such an example, the signal differentiator 550 may refer to the reuse region table prior to assigning a new reuse ID (one that has not been previously assigned to another signal ID) to determine whether the reuse ID for another signal ID should be assigned a reuse ID that was previously assigned to another signal ID. In other examples, the reuse ID for a reuse region of interest is unique to each signal ID received, measured, captured, and/or recorded in that reuse region. For example, an aggregated signal record having a signal ID "3" is assigned a reuse ID "1", while a signal record having a signal ID "6" is assigned a reuse ID "2," though the reuse regions of interest corresponding to the instant reuse IDs "1" and "2" are the same area or close to the same area.

The example signal record differentiator 830 of FIG. 8 identifies which of the aggregated signal records 702 have the same signal ID and the same reuse ID. The signal record differentiator 830 combines the aggregated signal records 702 (i.e., those having the same signal ID and the same reuse ID) into a single record as illustrated in the example data structure 900 of FIG. 9 to generate the example differentiated signal records 902. Accordingly, the differentiated signal records 902 of the illustrated example identify two signal records having the same signal ID but were transmitted from different regions (indicated by different reuse IDs "1" and "2").

The example signal quality analyzer 840 of FIG. 8 identifies which of the combined aggregated signal records 702 correspond to the greatest signal quality (e.g., $-0.38\ E_C/I_O$>- $0.79\ E_C/I_O$). Signal record 901 has the greatest signal quality in the illustrated example of FIG. 9. The signal quality analyzer 840 then retrieves the location information 744 from the aggregated signal record 901 corresponding to the greatest signal quality measurement (-0.38) and stores the location information 944 in the differentiated signal records 902. The differentiated signal records 902 may then be stored by the signal differentiator 550 in the signal record database 530 or at another storage location of the signal record database accessible by the base station locator 130.

Accordingly, the example signal differentiator 550 determines a sample location point corresponding to where a greatest signal quality value for a particular signal ID in a particular reuse area was measured from the signal records of the signal record database 530. The signal differentiator 550 accounts for several base stations within an area (e.g., a metropolitan area) using the same base station ID (e.g., accounts for signal reuse). Therefore, the signal differentiator 550 differentiates the signal records having the same signal ID, but being transmitted from different base stations.

Furthermore, by determining which aggregated signal records 702 for a particular signal ID are representative of signals transmitted from different base stations, the signal differentiator 550 also determines the aggregated signal records 702 coming from the same base station (e.g., the signal records having the same reuse ID (e.g., reuse ID "1") and the same signal ID). Such signal records are representative of the same signal ID being received at different locations surrounding the base station that transmitted the signal. Accordingly, the signal differentiator 550 selects the aggregated signal record 702 from signal records having the same reuse ID and the same signal ID that has the greatest signal quality value to be a potential sample location point for determining the base station location. This potential sample location point is representative of a location point in a sector corresponding to the signal ID in which the greatest signal quality was received by the signal receiver 110. For example, referring to the first signal S1 transmitted from the base station 200 of FIG. 2, the signal differentiator 550 ultimately determines a location in a sector corresponding to the first signal S1 where the first signal S1 was received with the greatest signal quality relative to all other measurements of the first signal S1. Accordingly, the location represented by the location information with the greatest signal quality may be considered a preferred sample location point relative to other locations of the other signal records for the corresponding sector (e.g., those signal records with the same reuse ID and same signal ID) because it provides the most accurate measurement of the signal relative to the other signal records. This location information is then used below by the signal localizer 570 of FIG. 12 to verify that correlated signal IDs (e.g., signal IDs representing other signals received at the same time as a sample signal ID) are being transmitted from the same base station (e.g., differentiated signal records of the correlated signal IDs provide location information within threshold distance).

While an example manner of implementing the signal differentiator 550 of FIG. 5 is illustrated in FIG. 8 one or more of the elements, processes and/or devices illustrated in FIG. 8 may be combined, divided, re-arranged, omitted, eliminated and/or implemented in any other way. Further, the example aggregated signal ID selector 810, the example reuse ID assigner 820, the example signal record differentiator 830, the example signal quality analyzer 840 and/or, more generally, the example signal differentiator 550 of FIG. 8 may be implemented by hardware, software, firmware and/or any combination of hardware, software and/or firmware. Thus, for example, any of the example aggregated signal ID selector 810, the example reuse ID assigner 820, the example signal record differentiator 830, the example signal quality analyzer 840 and/or, more generally, the example signal differentiator 550 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example aggregated signal ID selector 810, the example reuse ID assigner 820, the example signal record differentiator 830, and/or the example signal quality analyzer 840 is/are hereby expressly defined to include a tangible computer readable storage device or storage disk such as a memory, a digital versatile disk (DVD), a compact disk (CD), a Blu-ray disk, etc. storing the software and/or firmware. Further still, the example signal differentiator 550 of FIG. 5 may include one or more elements, processes and/or devices in addition to, or instead of, those illustrated in FIG. 8, and/or may include more than one of any or all of the illustrated elements, processes and devices.

Figure 10:
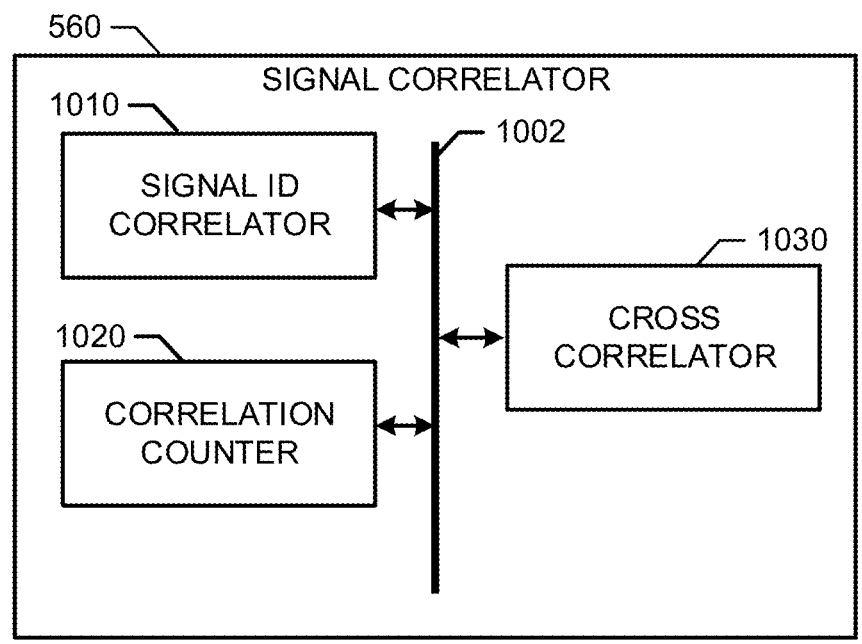
FIG. 10 is a block diagram of an example implementation of the example signal correlator of FIG. 5.

FIG. 10 illustrates an example implementation of the example signal correlator 560 of FIG. 5. The example signal correlator 560 of FIG. 10 identifies signals which have different signal IDs, but which were received, captured, and/or measured at or about the same time as a sample signal represented by a selected signal ID. The signal correlator 560 includes an example communication bus 1002 to facilitate communication between an example signal ID correlator 1010, an example correlation counter 1020, and an example cross correlator 1030. Referring to FIG. 11, the example signal correlator 560 correlates signal records from the signal record database 530 (e.g., the signal records 402 as well as other signal records with other signal IDs) to generate correlation records 1122 using the example data structures 1100, 1110, 1120.

In the illustrated example of FIG. 10, the signal ID correlator 1010 retrieves signal parameter message data extracted by the signal receiver 110, such as time information (e.g., GPS time 410), signal ID information (e.g., signal ID 430), signal category information (e.g., signal category 460), and/or record ID information from signal records in the signal record database 530.

In some examples, the signal ID correlator 1010 retrieves correlation records generated by the signal receiver 110 indicating all signals that were received, captured, and/or measured at a particular time and/or location. In other examples the signal ID correlator 1010 generates correlation records using a record ID (e.g., a number identifying or labeling a particular record), timing information, and/or location information. For example, for a selected signal ID, the signal ID correlator 1010 may identify all signal records (e.g., signal records 402) by record ID having the selected signal ID (e.g., signal ID "3"), and identify signals that were also received, captured, or measured having the same record ID. In other examples, the signal ID correlator 1010 may identify all records from the signal records (e.g., the signal records 402) received, captured, and/or measured at a specific time and/or location of a selected signal ID and generate the correlation records assuming that all records having the same time and/or location correspond to signals that were received, captured, and/or measured at the same time and/or location as the signal represented by the selected signal ID.

The signal ID correlator 1010 of the illustrated example selects a particular signal ID (hereinafter a parent signal ID) and determines signals (hereinafter child signal ID(s)), that were received, captured, or measured by the same record or at the same time and/or location as the present signal ID. For example, a parent signal ID is selected, and all records including that parent signal ID are scanned to identify child signal IDs. The signals represented by the parent and/or child signal IDs may have been active and/or neighbor signals at the time they were received, captured, and/or measured by the signal receiver 110. The signal ID correlator 1010 of the illustrated example generates a data structure 1100 including correlation signal records 1102 identifying a parent signal ID 1104 and child signal ID(s) 1106.

The example correlation counter 1020 of FIG. 10, identifies a number of times that a child signal ID 1106 is correlated to a parent signal ID 1104 (e.g., a signal with signal ID "3"). For example, a first signal is correlated with a second signal based on whether the first signal was received, captured, and/or measured in the same record and/or at the same time and/or location as the second signal. The correlation counter 1020 of the illustrated example identifies the correlated signal records 1102 and determines all child signal IDs for a particular parent signal ID and stores the child signal IDs in correlation field 1116. The example correlation counter 1020 of FIG. 10 counts a number of correlated records 1102 in which a child signal ID 1106 is correlated with a parent signal ID 1104 to generate correlated count records 1112 in data structure 1110 of FIG. 11. As an example from the correlated count records 1112 of FIG. 11, when a signal with signal ID "3" is selected as the parent signal ID, three of the correlated signal records 1102 identified that signals with signal IDs "6" and "9" are child signal IDs, and one of the correlated signal records 1102 identified that signals with signal IDs "103", "141", and "211" are child signal IDs. The counts related to a number of times a child signal ID was recorded with a parent signal ID in a signal record are stored in the correlated signal count field 1118 of the data structure 1110.

The example cross correlator 1030 of FIG. 10 determines the combined number of times that a parent or child signal ID is correlated to a particular child signal ID or parent signal ID, respectively. The cross correlator 1030 of the illustrated example identifies when a selected child signal ID for a particular parent signal ID identifies the parent signal ID as a child signal ID (e.g., when the selected child signal ID is selected as a parent signal ID). The cross correlator 1030 of FIG. 10 then generates correlation records 1122 in data structure 1120. The correlation records 1122 identify the cross correlations for particular parent and child signal IDs that are cross correlated and therefore assumed to be transmitted from one or more base stations in a particular area.

A cross correlation count may also be stored. For example, in the example correlation records 1122 of FIG. 11, the cross correlator 1030 determines that the signal identified by signal ID "3" is correlated with signals identified by signal IDs "6" and "9" five times, as shown in cross correlated count field 1128. When a cross correlation exists between two or more signal IDs, there is a likelihood that the signal IDs are transmitted from one or more base stations within a same area, and potentially from the same base station. Although the correlation records 1122 show only three signal IDs being correlated, more or less signal IDs may be correlated with one another.

In some examples, in order to lower processing latency, a relative threshold (e.g., 50%, 75%, etc.) of signal records that include a selected parent signal ID are analyzed for identifying child signal IDs. In such examples, once a record including a selected parent signal ID is identified as including the parent signal ID for determining the parent/child relationship, that record is removed from the pool of records used to determine parent/child relationships for other signal IDs. Accordingly, when selecting a parent signal ID that is the same as a child signal ID identified in a correlation record, a cross correlation cannot be determined within the same record. For example, one record identifying signal IDs 3, 6, 9, 101 cannot be used to determine that a cross correlation exists between signal IDs 3 and 6 because the record was found both when signal ID 3 was selected as the parent ID and when the signal ID 6 was selected as the parent ID.

Accordingly, in the illustrated example a first signal is cross correlated with a second signal when the first signal is represented by a parent signal ID or a child signal ID and when the second signal is represented by a child signal ID or the parent signal ID, respectively, and vice versa. Thus, a cross correlation exists when the parent signal ID referring to the child signal ID is reciprocated (e.g., the child signal ID refers to the parent signal ID). Thus, the signal correlator 560 determines which signals are associated (e.g., transmitted from the same base station) based on whether there is a cross correlation between the signals identified in the signal records of the signal record database 530 of FIG. 5. Accordingly, the example data structure 1124 identifies those signal IDs that are cross correlated with one another and identifies the number of total correlations in the cross correlated field 1128. If a first signal ID (e.g., signal ID "103") is not correlated with a second signal ID (e.g., signal ID "3"), the first signal ID is not included in the data structure 1124 and the first signal ID is not believed to be transmitted from the same area and/or the same base station. Thus, the correlation records 1122 identify signals likely to be transmitted from the same area and/or base station based on the identified cross correlations. In some examples, a relative threshold number of times that a cross correlation between two signals exists (e.g., 5%, 10%, 20% etc. of any records referring to at least one of the two signal IDs refer to both signal IDs) may be used to determine whether a signal ID is included in the correlation records 1122 identifying signals likely to be transmitted from the same base station.

Assume, for purposes of illustration, that the example signal IDs "103", "141", "211" are each correlated with signal ID "3" in correlated signal records 1102. However, there is no cross correlation of these signal records. Accordingly the signal IDs "103", "141", "211" although identified as child signal IDs for signal ID "3" did not identify the signal ID "3" as a child ID when selected as a parent ID. As a result, the signal IDs "103", "141", "211" are not likely to have been transmitted from the same base station as signal ID "3", and thus are not included in the correlation records 1122.

While an example manner of implementing the signal correlator 560 of FIG. 5 is illustrated in FIG. 10 one or more of the elements, processes and/or devices illustrated in FIG. 10 may be combined, divided, re-arranged, omitted, eliminated and/or implemented in any other way. Further, the example signal ID correlator 1010, the example correlation counter 1020, the example cross correlator 1030 and/or, more generally, the example signal correlator 560 of FIG. 10 may be implemented by hardware, software, firmware and/or any combination of hardware, software and/or firmware. Thus, for example, any of the example signal ID correlator 1010, the example correlation counter 1020, the example cross correlator 1030 and/or, more generally, the example signal correlator 560 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal ID correlator 1010, the example correlation counter 1020, and/or the example cross correlator 1030 is/are hereby expressly defined to include a tangible computer readable storage device or storage disk such as a memory, a digital versatile disk (DVD), a compact disk (CD), a Blu-ray disk, etc. storing the software and/or firmware. Further still, the example signal correlator 560 of FIG. 5 may include one or more elements, processes and/or devices in addition to, or instead of, those illustrated in FIG. 10, and/or may include more than one of any or all of the illustrated elements, processes and devices.

Figure 11:
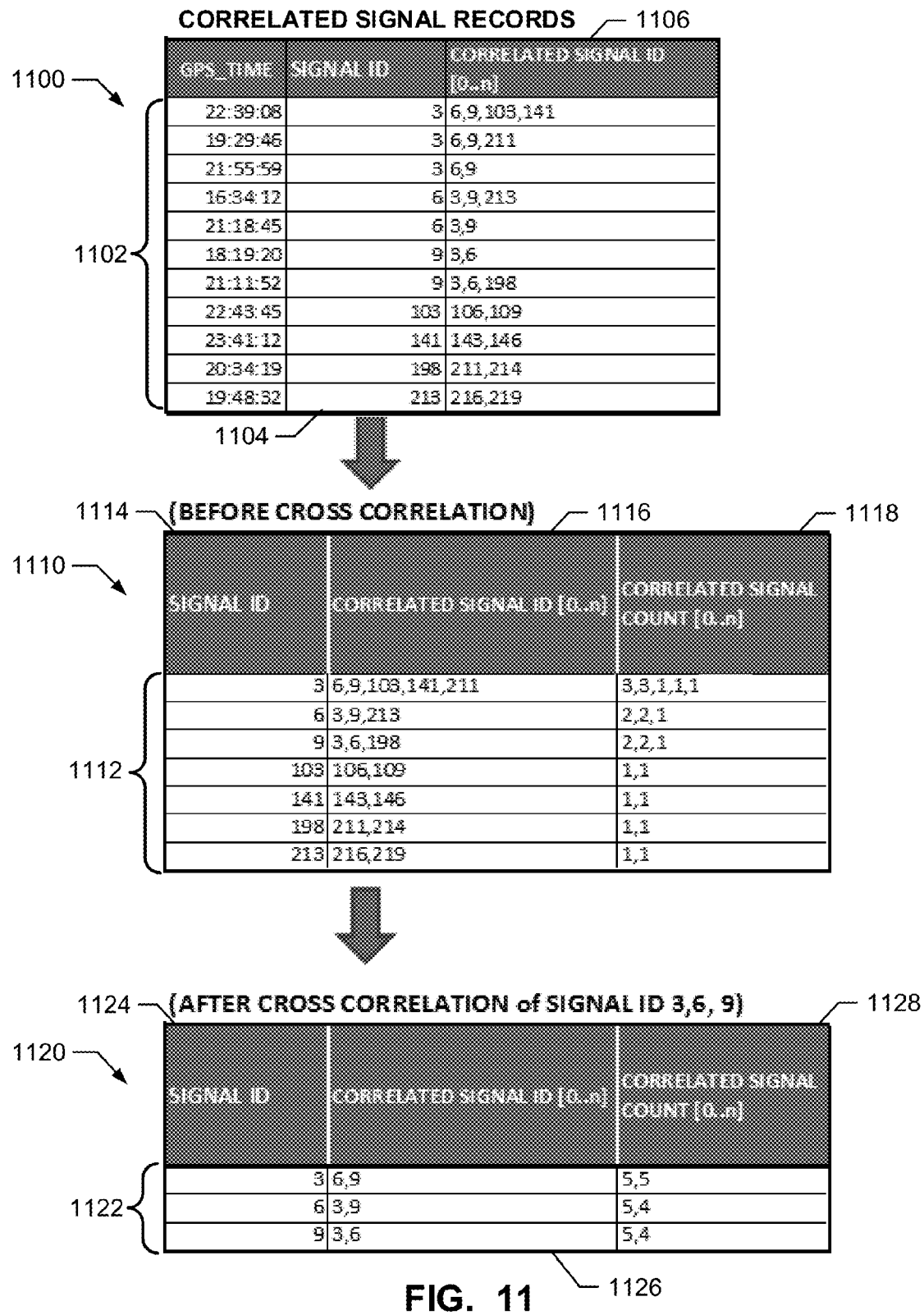
FIG. 11 illustrates example data structures generated by the example signal correlator of FIG. 10.
Figure 12:
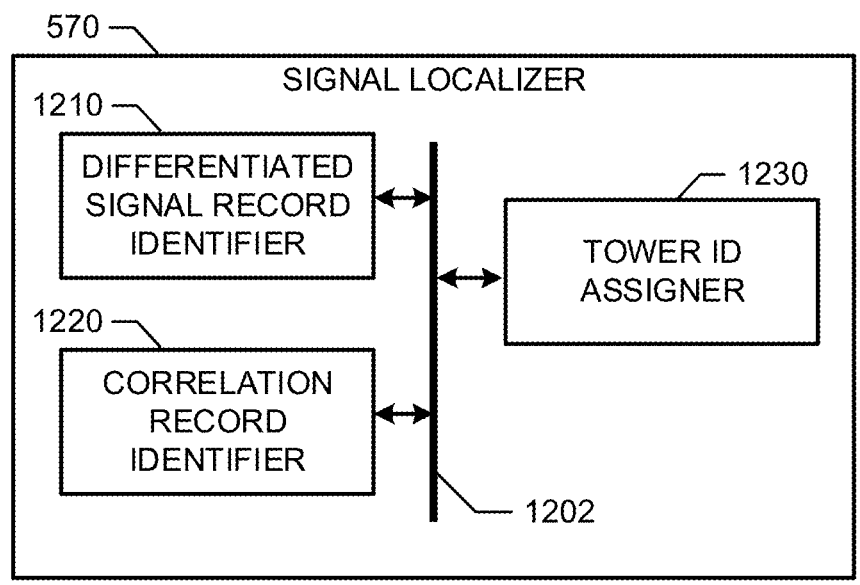
FIG. 12 is a block diagram of an example implementation of the example signal localizer of FIG. 5.

FIG. 12 illustrates an example implementation of the signal localizer 570 FIG. 5. The example signal localizer 570 of FIG. 12 identifies a group of transceivers that belong to the same base station based on differentiated signal records (e.g., the differentiated signal records 902) and correlation records (e.g., the correlation records 1122). The signal localizer 570 includes an example communication bus 1202 to facilitate communication between an example differentiated signal record identifier 1210, a correlation record identifier 1220, and a tower identification (tower ID) assigner 1230. The signal localizer 570 of the illustrated example identifies tower transceivers using the differentiated signal records 902 of FIG. 9 and the correlation records 1122 of FIG. 11 to generate tower records 1302 in an example data structure 1300 as shown in FIG. 13.

In the illustrated example of FIG. 12, the differentiated signal record identifier 1210 selects a particular signal ID (e.g., signal ID "3") for tower identification. The example differentiated signal record identifier retrieves the example differentiated signals records 1312 (e.g., differentiated signal records 902 from the data structure 900 and differentiated signal records for other signal IDs (e.g., signal IDs "6" and "9")). The differentiated signal record identifier 1210 provides the signal ID information to the correlation record identifier 1220. The correlation record identifier 1210 retrieves the correlated signal ID information from the data structure 1120 for the received signal ID information, and provides the correlated signal ID information to the example tower ID assigner 1230.

The example tower ID assigner 1230 of FIG. 12 identifies signal records in the differentiated signal records 1312 matching the signal IDs identified in the correlation records 1122. The tower ID assigner 1230 of the illustrated example calculates a distance between locations identified by location information 1344 of the selected signal ID (e.g., signal ID "3") and the signal records of the correlated signal IDs (e.g., signal IDs "6" and "9" of the correlation records 1122). The tower ID assigner 1230 then assigns a unique tower ID to the differentiated signal records 1312 having location information designating locations within a threshold distance of one another. For example, if the distance information 1344 of a correlated signal ID (e.g., signal ID "6" of the correlation records 1122) is located within a threshold distance (e.g., 100 meters, 300 meters, etc.) of the distance information of the selected signal ID (e.g., signal ID "3" of the correlation records 1122), then the signal records are assigned the same tower ID 1308 (e.g., tower ID "1") in the tower records 1302. In the illustrated example of FIG. 13, the first record and the third record of the example tower records 1302 resulted in a distance calculation within the threshold distance. Accordingly, the first record and the third record were both associated with the same tower ID 1308. On the other hand, the example tower ID assigner 1230 calculated a distance value between the second record and the third record that exceeds the example threshold distance value. As such the second record is not associated with the first and third records because the signal(s) represented by the second record cannot be transmitted from the same base station. The example threshold distance may be defined by a user input provided via the user interface 520.

Figure 13:
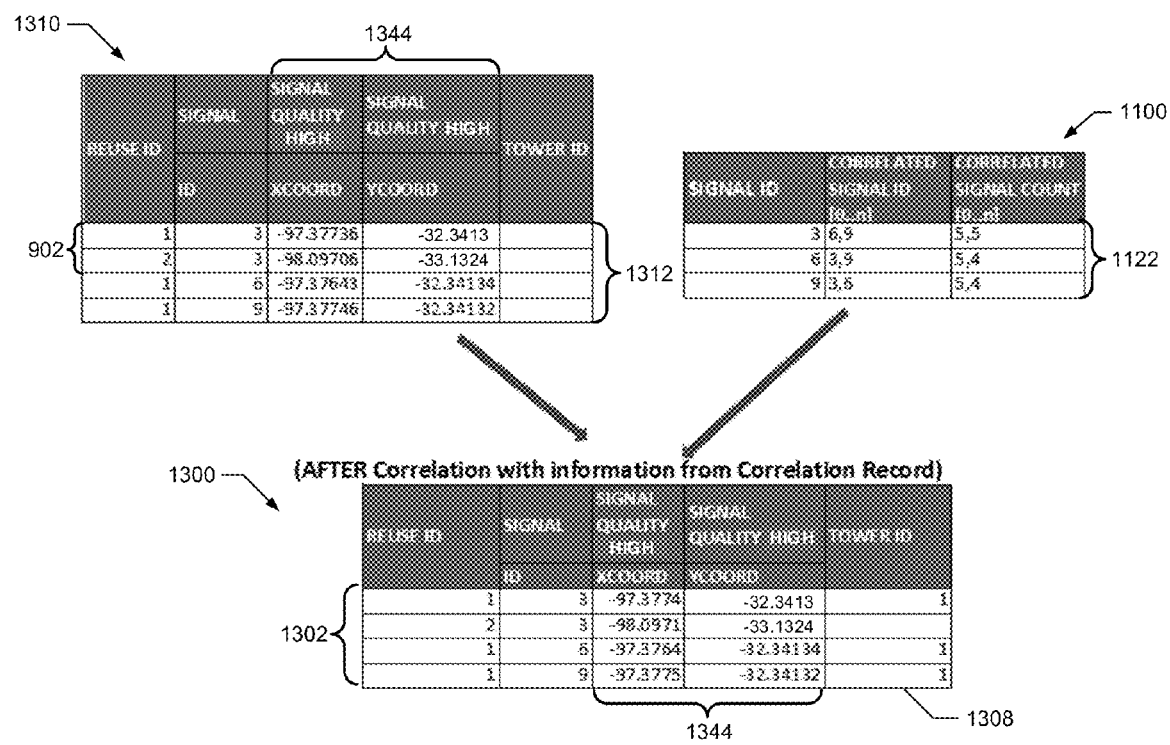
FIG. 13 illustrates an example data structure generated by the example signal localizer of FIG. 12.

In some examples, although not shown in FIG. 13, more than three signals IDs may be provided by the signal correlator 560. Accordingly, because, at the present time, a base station may transmit no more than three different signal IDs, the signal localizer 570 may determine that one or more of the provided correlated signals are not transmitted from the same base station based on the location information received from the signal differentiator 550. Of course, the number may change as new base stations and/or technologies are developed.

The signal localizer 570 of the illustrated example determines which (if any) of the correlated signals are transmitted from the same base station using the location information provided by the signal differentiator 550. As long as the locations where the greatest signal quality was received for each of the correlated signal IDs are within a threshold distance of one another, then the signals identified by the correlated signal IDs are determined to be transmitted from the same base station. For example, the signal localizer 570 may determine that a first signal ID is transmitted from a first sector transmitter of a base station and a second signal ID is transmitted from a second sector transmitter of the same base station.

While an example manner of implementing the signal localizer 570 of FIG. 5 is illustrated in FIG. 12 one or more of the elements, processes and/or devices illustrated in FIG. 12 may be combined, divided, re-arranged, omitted, eliminated and/or implemented in any other way. Further, the example differentiated signal record identifier 1210, the example correlation record identifier 1220, the example tower ID assigner 1230 and/or, more generally, the example signal localizer 570 of FIG. 12 may be implemented by hardware, software, firmware and/or any combination of hardware, software and/or firmware. Thus, for example, any of the example differentiated signal record identifier 1210, the example correlation record identifier 1220, the example tower ID assigner 1230 and/or, more generally, the example signal localizer 570 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example differentiated signal record identifier 1210, the example correlation record identifier 1220, and/or the example tower ID assigner 1230 is/are hereby expressly defined to include a tangible computer readable storage device or storage disk such as a memory, a digital versatile disk (DVD), a compact disk (CD), a Blu-ray disk, etc. storing the software and/or firmware. Further still, the example signal localizer 570 of FIG. 5 may include one or more elements, processes and/or devices in addition to, or instead of, those illustrated in FIG. 12, and/or may include more than one of any or all of the illustrated elements, processes and devices.

Figure 14:
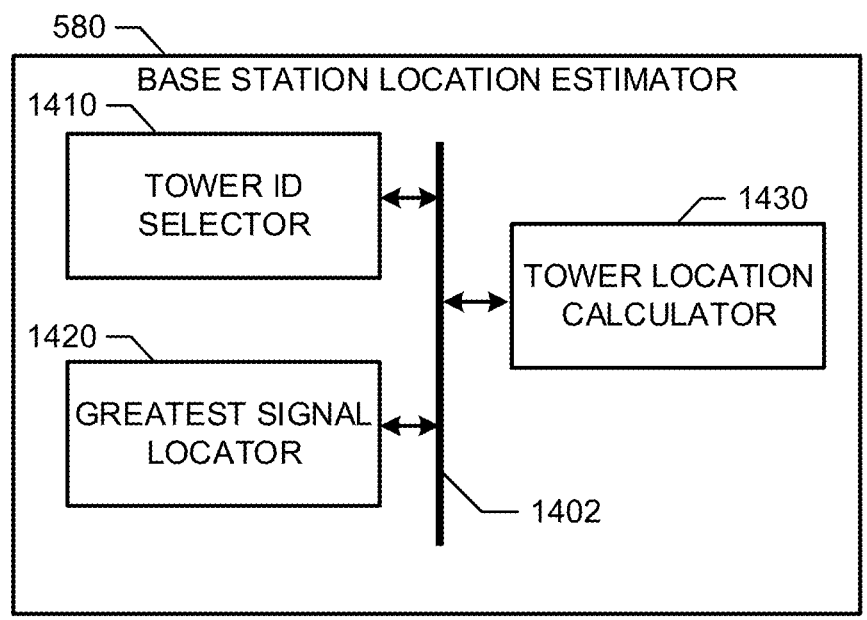
FIG. 14 is a block diagram of an example implementation of the example base station location estimator of the example base station locator of FIG. 5.

FIG. 14 illustrates an example implementation of the example base station location estimator 580 of FIG. 5. The example base station location estimator 580 of FIG. 14 estimates a location of a base station based on the tower records 1302 using location information 1344. As described above, the location information 1344 identifies a location where the signal receiver 110 measured the greatest signal quality of a signal identified by a signal ID in a corresponding area (e.g., an area represented by the reuse ID). The base station location estimator 580 includes a communication bus 1402 to facilitate communication between an example tower ID selector 1410, an example greatest signal locator 1420, and an example tower location calculator 1430. The base station location estimator 580 of the illustrated example estimates a tower location using the location information 1344 of the tower records 1302.

The example tower ID selector 1410 of FIG. 14 selects a particular tower ID (e.g., tower ID "1" of the tower IDs 1308) to determine the base station location of a base station corresponding to the selected tower ID. The tower ID selector 1410 of the illustrated example provides the tower ID to the greatest signal locator 1420. The greatest signal locator 1420 retrieves location information 1344 corresponding to the location of the signal receiver 110 for the signal with the relative greatest signal quality of the signal for the corresponding (e.g., signal ID "3", "6", "9") for the selected tower ID 1308. The greatest signal locator 1420 provides the location information 1344 to the tower location calculator 1430 to facilitate estimating the location of the base station. In the illustrated examples, receiver location information 1544 of the receiver location information records 1502 (data structure 1500 of FIG. 15) is recorded for the relative greatest signal quality measurements determined from the aggregated signal records 702 and differentiated signal records 902. Thus, the location information 1544 provides sample location points for estimating the location of a base station.

Figure 15:
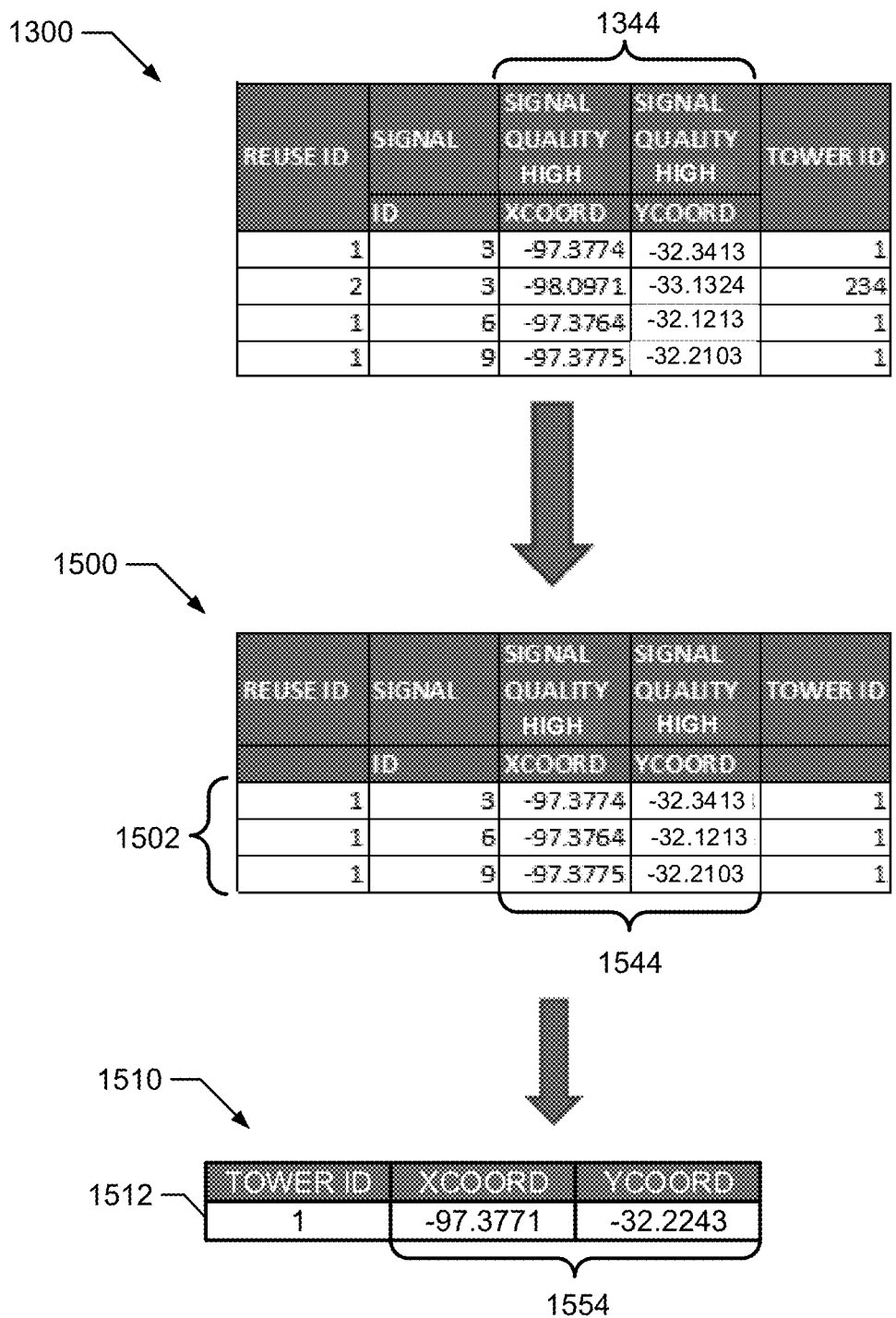
FIG. 15 illustrates an example data structure generated by the example base station location estimator of FIG. 14.

In the illustrated example of FIG. 15, three signal IDs are correlated (e.g., signal IDs "3", "6", and "9"). Accordingly, the tower location calculator 1430 calculates the base station location from the sample location points. In some examples, when a tower ID is assigned to a single tower record (e.g., when there is only one location point to estimate the base station location), the base station location represented by the tower ID is set as the location information 1544 of the corresponding tower record. In other examples, when there is more than one tower record for a particular tower ID (e.g., there are two or more sample location points to estimate the base station location), the tower location calculator 1430 determines the centroid (e.g., by finding the midpoint between two sample location points, or a centroid of three or more sample location points).

While an example manner of implementing the base station location estimator 580 of FIG. 5 is illustrated in FIG. 14 one or more of the elements, processes and/or devices illustrated in FIG. 14 may be combined, divided, re-arranged, omitted, eliminated and/or implemented in any other way. Further, the example tower ID selector 1410, the example maximum signal locator 1420, the example tower location calculator 1430 and/or, more generally, the example base station location estimator 580 of FIG. 14 may be implemented by hardware, software, firmware and/or any combination of hardware, software and/or firmware. Thus, for example, any of the example tower ID selector 1410, the example maximum signal locator 1420, the example tower location calculator 1430 and/or, more generally, the example base station location estimator 580 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example tower ID selector 1410, the example maximum signal locator 1420, and/or the example tower location calculator 1430 is/are hereby expressly defined to include a tangible computer readable storage device or storage disk such as a memory, a digital versatile disk (DVD), a compact disk (CD), a Blu-ray disk, etc. storing the software and/or firmware. Further still, the example base station location estimator 580 of FIG. 5 may include one or more elements, processes and/or devices in addition to, or instead of, those illustrated in FIG. 14, and/or may include more than one of any or all of the illustrated elements, processes and devices.

Figure 16A:
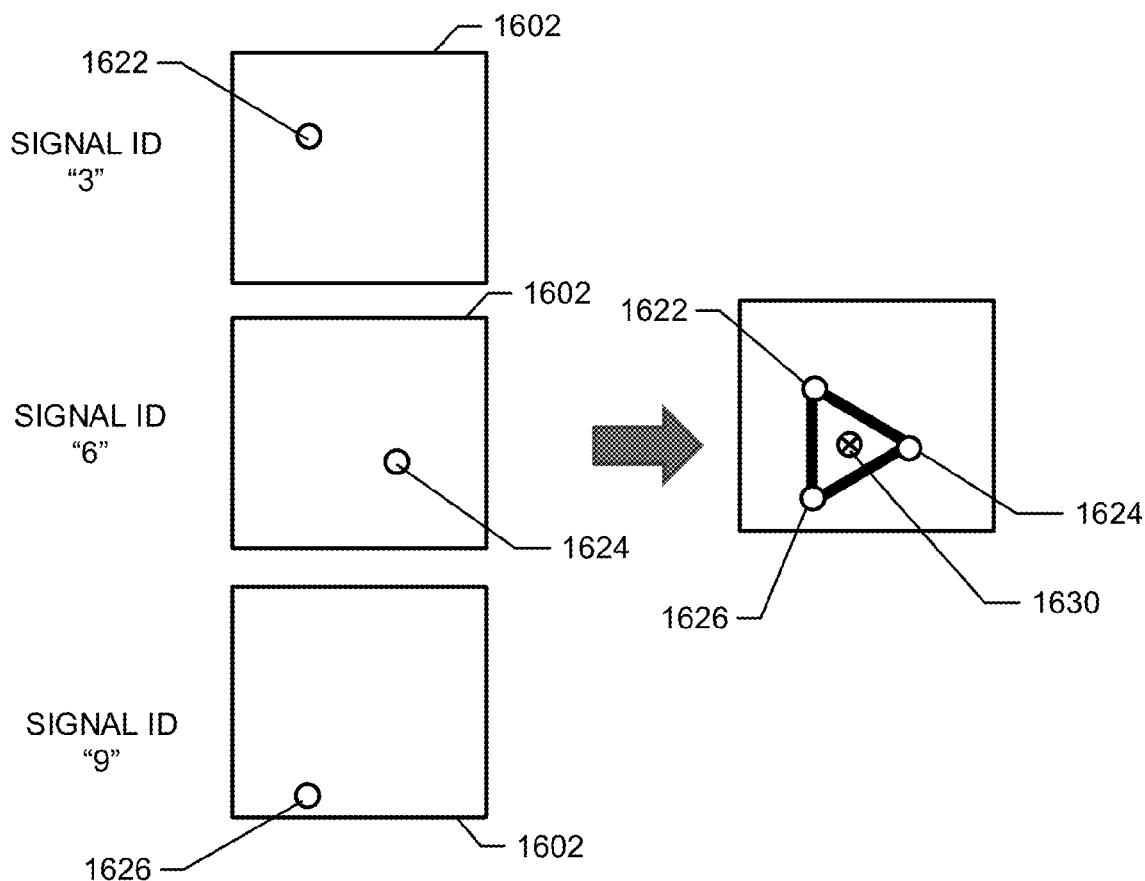
FIG. 16A illustrates an example base station location estimation process that may be performed by the example base station location estimator of FIG. 14 to determine the location of a base station from data in the data structure of FIG. 15.

FIG. 16A illustrates the calculation of a base station location. In the example of FIG. 16A, a same reuse area 1602 of a base station is illustrated three times at three different possible locations 1622, 1624, 1626 corresponding to the location information 1544 of the location records 1502. The tower location calculator 1430 determines a centroid of the locations 1622, 1624, 1626 to place the base station location at 1630. For example, the tower location calculator 1430 may determine the centroid 1630 to be identified by the location coordinates 1554 of FIG. 15 and store the location information 1554 in a base station location record 1512. The base station location record 1512 may be stored in the signal record database 530 or other database associated with the data collector 120.

In some examples, a more complex triangulation may be performed based on the values of the signal quality (and/or signal strength) of the corresponding differentiated signal records 902. For example, the base station location 1630 may not be at the center of the triangulation but offset toward a first location (e.g., the location 1622) due to better signal quality found in a signal record (e.g., a signal record having signal ID "3").

Figure 16B:
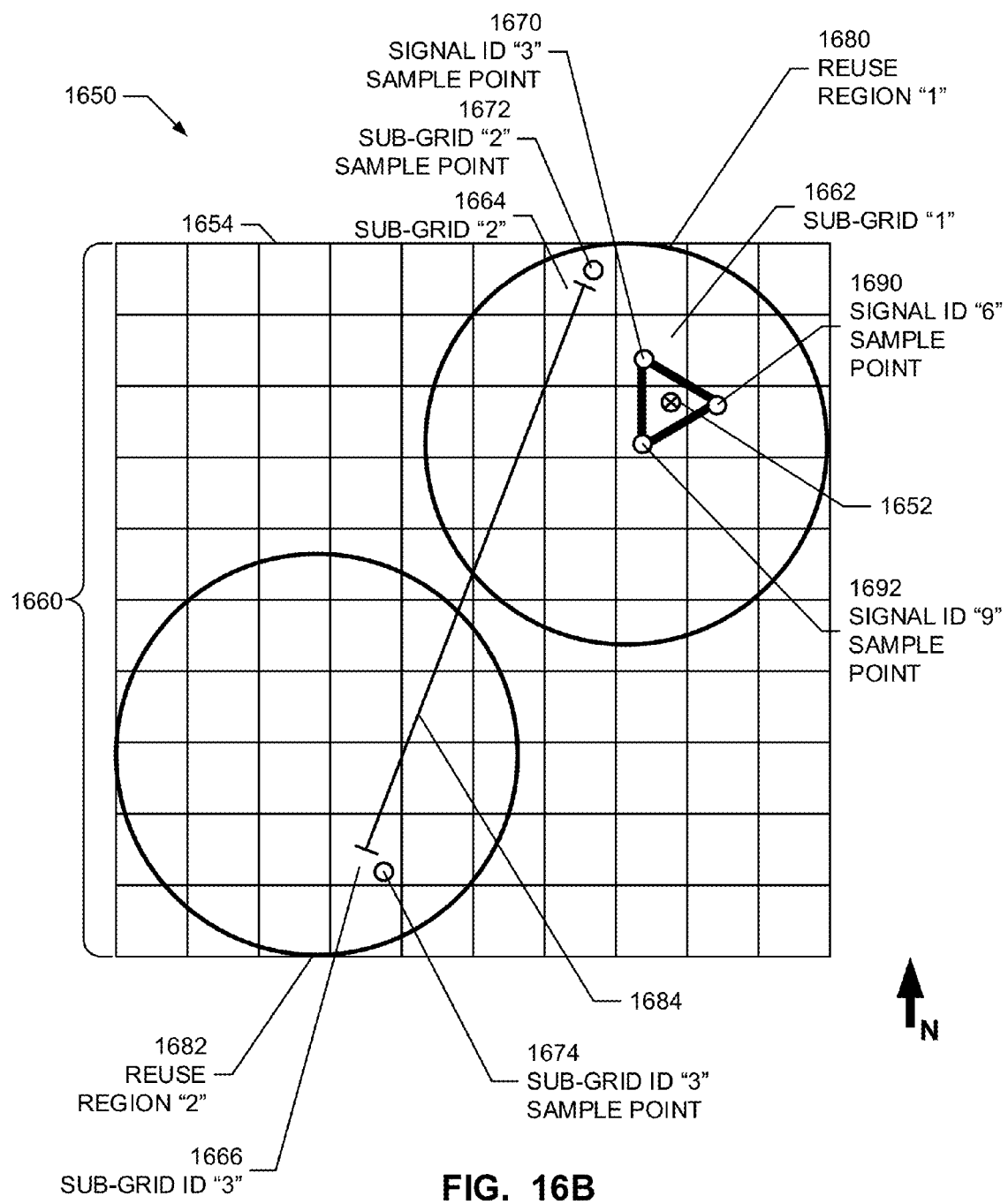
FIG. 16B illustrates an example display of example results found using example methods, apparatus, and articles of manufacture disclosed herein to determine a base station location.

FIG. 16B illustrates an example display of example results found using example methods, apparatus, and articles of manufacture disclosed herein to determine a base station location. For the illustrated example of FIG. 16B, assume the signal receiver 110 of FIGS. 1 and/or 3 is used on a drive test and signal records are generated and forwarded to the base station locator 130. The base station locator 130 then estimates and/or determines a base station location 1652 as described below with respect to FIG. 16B.

In the example of FIG. 16B, the signal receiver 110 is transported throughout the area 1650 (e.g., throughout some or all of a grid 1654). In some examples, a perimeter of an area covered (e.g., the perimeter of the grid 1654) on a drive test (or a plurality of drive tests) by the signal receiver 110 determines the size of the area 1650 (e.g., using GPS location measurements) and/or the size of a grid 1654. Using location information stored in the signal records, the sub-grid ID assigner 620 of the signal aggregator 540 of FIG. 6 plots the grid 1654 across the area 1650. For example, the sub-grid ID assigner 620 may identify a northernmost geographic coordinate, a southernmost geographic coordinate, a westernmost geographic coordinate, and an easternmost geographic coordinate in the location information of the signal records in the signal record database 530 for a particular drive test or region. In such an example, the sub-grid ID assigner 620 plots the grid 1654 based on the identified coordinates. The sub-grid ID assigner 620 plots the grid 1654 with a plurality of sub-grids 1660 based on a preferred (e.g., based on user preference) grid size and/or shape (e.g., 100 m by 100 m square).

In a first sub-grid 1662 of the illustrated example of FIG. 16B, the signal receiver 110 may have measured, received, captured, and/or recorded a plurality of signals and/or signal information corresponding to a plurality of signal IDs (e.g., signals IDs "3", "6", "9"). For all signal records for received signals having the same signal ID, for example signal ID "3", and determined to be received, measured, or captured in the first sub-grid 1662 (and all sub-grids 1660), the sub-grid ID assigner 620 assigns a sub-grid ID (e.g., sub-grid ID "1") to the instant signal records. The signal record aggregator 630 of FIG. 6 aggregates those records into a single aggregated signal record (e.g., the first row of the aggregated signal records 702) corresponding to signal ID "3" for sub-grid 1662. The same analysis is repeated for all sub-grids 1660, including second and third sub-grids 1664, 1666, assigned sub-grid IDs "2" and "3", respectively.

The example aggregation calculator 640 of FIG. 6 determines the highest signal quality measured within each of the sub-grids 1660 for each signal ID of the corresponding signal records representing signals received in each of the sub-grids 1660. The aggregation calculator 640 also determines locations 1670, 1672, 1674 where the highest signal quality was measured for signal ID "3" in the sub-grids 1662, 1664, 1666 respectively. The aggregation calculator 640 does the same for all signals IDs and all sub-grids 1660.

In the illustrated example of FIG. 16B, the reuse ID assigner 820 of the signal differentiator of FIG. 8 determines reuse regions, such as reuse regions 1680, 1682, within the area 1650. In the illustrated example, the reuse ID assigner 820 calculates a distance between the sub-grids 1662, 1664, 1666. If any of the sub-grids (e.g., the first and second sub-grids 1662, 1664) the aggregated signal records are within a threshold distance, the reuse ID assigner 820 assigns a same reuse ID to the instant aggregated signal records. For example, the first and second sub-grids 1662, 1664 are within a reuse threshold distance of each other and assigned a reuse ID "1" representing the reuse region 1680. In the illustrated example, the third sub-grid 1666 is not located within the reuse threshold distance of the first sub-grid 1662 and/or the second sub-grid 1664, and thus is assigned a different reuse ID "2" representing the reuse region 1682. For example the distance 1684, representing the distance between the second sub-grid 1664 and the third sub-grid 1666, is greater than the reuse threshold distance. The example reuse regions 1680, 1682 indicate that the signals having the signal ID "3" and being (or having been) received in the third sub-grid 1666 do not come from the same base station as the signals received in the first and second sub-grids 1662, 1664 because the third sub-grid 1666 is located outside the reuse threshold distance from the first and second sub-grids 1662, 1664.

The example signal record differentiator 830 of FIG. 8 combines the aggregated signal records having the same signal ID (e.g., the signal ID "3") and the same reuse ID (e.g., the reuse ID "1"). For example, a differentiated signal record is generated for the aggregated records generated for the sub-grids 1662, 1664. The example signal quality analyzer 840 determines which aggregated signal record of the combined aggregated signal records has the greatest signal quality. In other words, the signal quality analyzer determines in which of the first or second sub-grids 1662, 1664 the receiver 110 measured the highest signal quality. In the illustrated example, the signal quality analyzer 840 determines the aggregated signal record of the sub-grid 1662 has the greatest signal quality for signal ID "3". Accordingly, the location 1670 is the location within the reuse region 1680 where a signal having the signal ID "3" has the greatest signal quality relative to all signal measurements of signals with signal ID "3" measured in the reuse region 1680. Thus, the location 1670 provides a preferred sample location point 1670 to determine the base station location 1652 of a base station transmitting a signal with signal ID "3".

In the illustrated example, the same analysis (e.g., aggregation, differentiation) is done for the signal IDs "6" and "9". Accordingly, the locations 1690, 1692 are determined to be the preferred sample location points 1690, 1692 of the reuse region 1680 where the greatest signal quality was measured for signal IDs "6" and "9", respectively. In some examples, the reuse region 1680 is identified by a different reuse ID for signal IDs "6" and/or "9" from the reuse ID "1" used for signal ID "3". In such examples, the use of different reuse IDs for a same or similar region (e.g., the reuse region 1680) enables the assignment of reuse IDs to be relative to a particular signal ID.

In FIG. 16B, the example signal localizer 570 of FIG. determines whether the sample location points 1670, 1690, 1692 are within a threshold distance (e.g., 150 meters). In the illustrated example, the sample location points 1670, 1690, 1692 are within a threshold distance, and therefore are assigned the same tower ID. Finally, the example base station location estimator 580 uses the geographic coordinates of the sample location points 1670, 1690, 1692 to estimate the base station location 1652.

Figure 17:
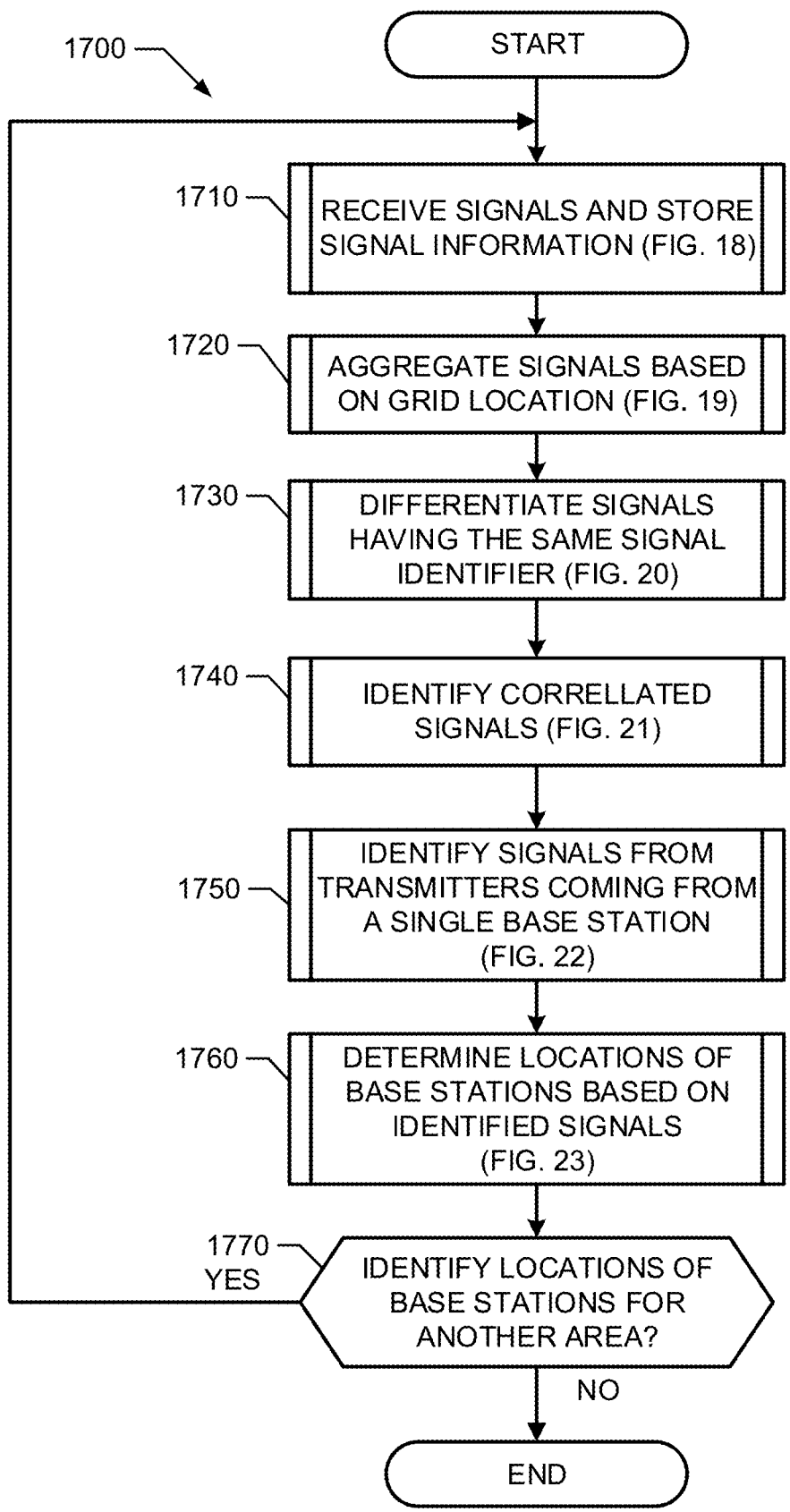
FIG. 17 is a flowchart representative of example machine readable instructions that may be executed to implement the example system of FIG. 1, including the example signal receiver of FIG. 3 and the example data collector of FIG. 5.

A flowchart representative of example machine readable instructions for implementing the system, including the signal receiver 110 and the data collector 120, of FIG. 1 is shown in FIG. 17. In this example, the machine readable instructions comprise a program 1700 for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIG. 17, many other methods of implementing the example system, including the signal receiver 110 and the data collector 120, of FIG. 1 may alternatively be used. For example, the order of execution of the blocks may be changed, and/or some of the blocks described may be changed, eliminated, or combined.

The program 1700 of FIG. 17 begins at block 1700 with an initiation of the system of FIG. 1 (e.g., instructing the signal receiver 110 to begin receiving and collecting signal information and/or instructing the data collector 120 to process the signal data received). The program 1700 is executed to determine the location of one or more base stations in a given area using signal information received from signal parameter messages transmitted from the one or more base stations (e.g., the signal parameter messages are received during a drive test).

At block 1710 of FIG. 17, as further described below in connection with FIG. 18, the example signal receiver 110 begins receiving/retrieving signals and/or signal parameters and stores signal information in the received signal database 360 and/or the signal record database 530. At block 1720, as further described below in connection with FIG. 19, the example signal aggregator 540 of the example base station locator 130 aggregates signal records based on a signal ID and a location (e.g., a sub-grid location) of where the signals were received. At block 1730, as further described below in connection with FIG. 20, the example signal differentiator 550 of the base station locator 130 differentiates the aggregated signal records to account for signal reuse based on an inter-grid distance (e.g., a distance between two grids).

At block 1740 of FIG. 17, as further described below in connection with FIG. 21, the example signal correlator 560 of the base station locator 130 identifies associations between signal IDs based on signal record correlations. Signal records may be correlated if they were received, captured, and/or measured in the same record or at the same time and/or location. At block 1750, as further described below in connection with FIG. 22, the example signal localizer 570 of the base station locator 130, determines whether correlated signals (determined in block 1740) are coming from transceivers of the same base station based on the location where greatest signal quality was measured for the correlated signals (determined in block 1730). At block 1760, as further described below in connection with FIG. 23, the example base station location estimator 580 calculates the base station location of the base station using the location information for the correlated signals.

At block 1770, the signal receiver 110 and/or data collector 120 determines whether the locations of base stations are to be determined for another area (e.g., if a drive test is to be performed in another area and a base station location analysis is to be performed in that area). If base station locations are to be determined in another area, control returns to block 1710 to receive more data signals. In some examples, if signal data has already been received and forwarded to the example data collector 120, control may return to block 1720. If no other base station locations are to be determined (block 1770), the program 1700 ends.

Figure 18:
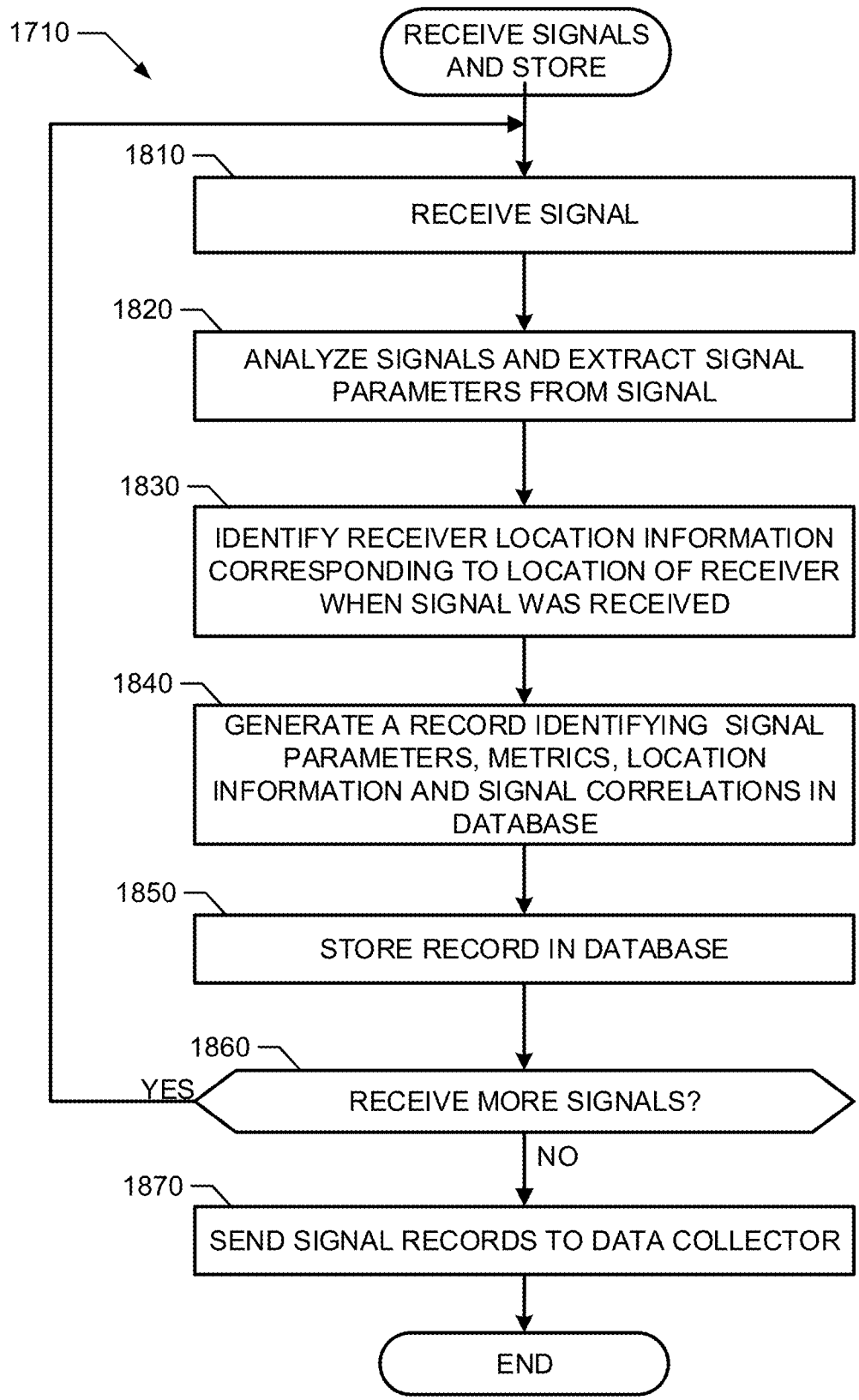
FIG. 18 is a flowchart representative of example machine readable instructions that may be executed to implement the example receiver of FIG. 3.

A flowchart representative of example machine readable instructions for implementing the signal receiver 110 of FIG. 1 and/or FIG. 5 is shown in FIG. 18. In this example, the machine readable instructions comprise a program 1710 for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIG. 18, many other methods of implementing the example signal receiver 110 of FIG. 5 may alternatively be used. For example, the order of execution of the blocks may be changed, and/or some of the blocks described may be changed, eliminated, or combined.

The program 1710 of FIG. 18, which may be executed to implement block 1710 of FIG. 17, begins at block 1810 with an initiation of the example signal receiver 110 of FIGS. 1 and/or 3 (e.g., the signal receiver 110 is to begin collecting signal information on a drive test). At block 1810, the example signal data receiver 310 of FIG. 3 receives a signal parameter message in a signal (e.g., one of the signals S1, S2, S3 of FIG. 2) transmitted from a transmitter (e.g., one of the transmitters T1, T2, T3 of FIG. 2) of a base station (e.g., the base station 102 of FIG. 1 and/or FIG. 2) in an area (e.g., the environment 100 of FIG. 1).

At block 1820 of FIG. 18, the example signal analyzer 320 of FIG. 3 analyzes the signal and extracts signal parameters (e.g., signal ID, signal category, neighbor signal information, correlated signal information, etc.) from the signal parameter message. The example signal analyzer 320 analyzes the signal by taking signal measurements, such as signal strength and signal quality. In some examples, the signal analyzer 320 extracts active signal/neighbor signal information associated with the received signal. At block 1830, the example geographic locator 330 of FIG. 3 determines the location of the signal receiver 110 when the signal is received.

At block 1840 of FIG. 18, the signal record generator 340 of FIG. 3 generates a signal record (e.g., one of the signal records 402 of FIG. 4) for the received signal. The signal record identifies the signal parameters, signal measurements, location information where the signal was received, etc. In some examples, the signal record generator 340 generates associated signal records indicating other signals identifiers (e.g., identifiers identifying other active signals or neighbor signals) received, captured, and/or recorded at or about the same time as the received signal. The signal record generator 340 stores the generated signal record in the received signal database 360 (block 1850).

At block 1860 of FIG. 18, the signal receiver 110 determines whether more signals are to be received. If the signal receiver 110 is to continue receiving signals, control returns to block 1810. If the signal receiver 110 is not to continue receiving signals, control advances to block 1870. At block 1870, for example in response to a request from a user via the data collector 120, the collector interface 350 outputs signal records stored in the signal database to the data collector 120. After block 1870, the program 1710 ends.

Figure 19:
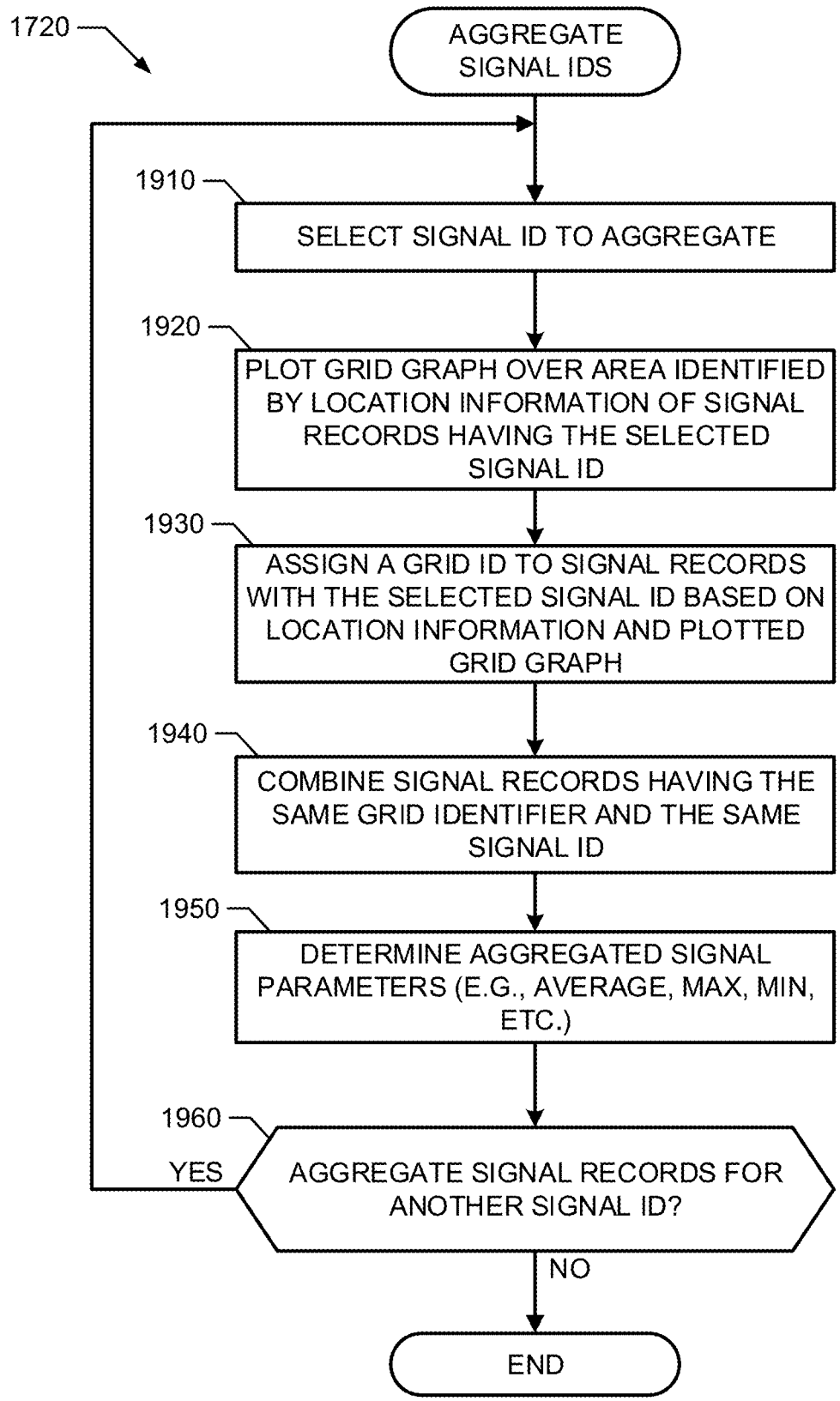
FIG. 19 is a flowchart representative of example machine readable instructions that may be executed to implement the example signal aggregator of FIG. 6.

A flowchart representative of example machine readable instructions for implementing the signal aggregator 540 of FIG. 5 is shown in FIG. 19. In this example, the machine readable instructions comprise a program 1720 for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIG. 19, many other methods of implementing the example signal aggregator 540 of FIG. 5 may alternatively be used. For example, the order of execution of the blocks may be changed, and/or some of the blocks described may be changed, eliminated, or combined.

The program 1720 of FIG. 19, which may be executed to implement block 1720 of FIG. 17, begins at block 1910 with an initiation of the base station locator 130 of FIG. 5 (e.g., the base station locator 130 receives a request from the user interface 520 to identify base station locations from signal records in the signal record database 530). As explained below, the example program 1720 of FIG. 19 may repeat as needed to consider any number of signal IDs of interest.

At block 1910, the example signal ID selector 610 of FIG. 6 selects a signal ID of interest in the received signal records for aggregation. At block 1920 of FIG. 19, the example sub-grid ID assigner 620 of FIG. 6 plots a grid graph over an area defined by location information in the signal records. At block 1930, the sub-grid ID assigner 620 assigns a sub-grid ID to the signal records having the selected signal ID based on the location information. As described above, each sub-grid of interest may be defined and/or otherwise established with a particular size and shape. Any number of grids may represent an overall area of interest, such as an area associated with a cell tower service area. The sub-grid ID identifies in which sub-grid the signal receiver 110 was located when the receiver received the signal corresponding to the signal record.

At block 1940 of FIG. 19, the example signal record aggregator 630 of FIG. 6 aggregates the signal records that have the same sub-grid ID and the same signal ID. Accordingly, a single aggregated signal record is generated for each sub-grid of a grid (e.g., a grid over an area, such as a town, metropolitan area, region, etc.) for each signal having the same signal ID that is received in that grid. Despite having signal ID and sub-grid location information, signal records having the same signal ID may also be differentiated to account for signal reuse (e.g., more than one base station using and/or otherwise broadcasting/transmitting the same signal ID). Thus, the aggregated signal records are provided for further processing to be differentiated, as described below, to account for signal reuse.

At block 1950, the example aggregation calculator 640 of FIG. 6 calculates the distribution statistics of the aggregated signal records (e.g., signal strength average values, highest/lowest signal strength values recorded, signal quality average values, highest/lowest signal quality values recorded, etc.). Accordingly, the aggregated signal records provide a combined record of signals received near to or at the same/similar location, as well as statistics of those signals, thus providing preferred signal information (e.g., a location where a highest/greatest signal quality was received within a sub-grid, etc.) relative to the measured signal parameters for a particular signal having that signal ID and being received within a particular sub-grid location.

At block 1960, the example signal aggregator 540 of FIGS. 5 and/or 6 determines whether there are more signal IDs that are to be aggregated. If more signal records are to be aggregated (e.g., not all signal records have been assigned a sub-grid ID), then control returns to block 1910. If there are no more signal IDs that are to be aggregated (e.g., all signal records have been aggregated and/or all signal records have been assigned a sub-grid ID), then the program 1720 of FIG. 19 ends.

Figure 20:
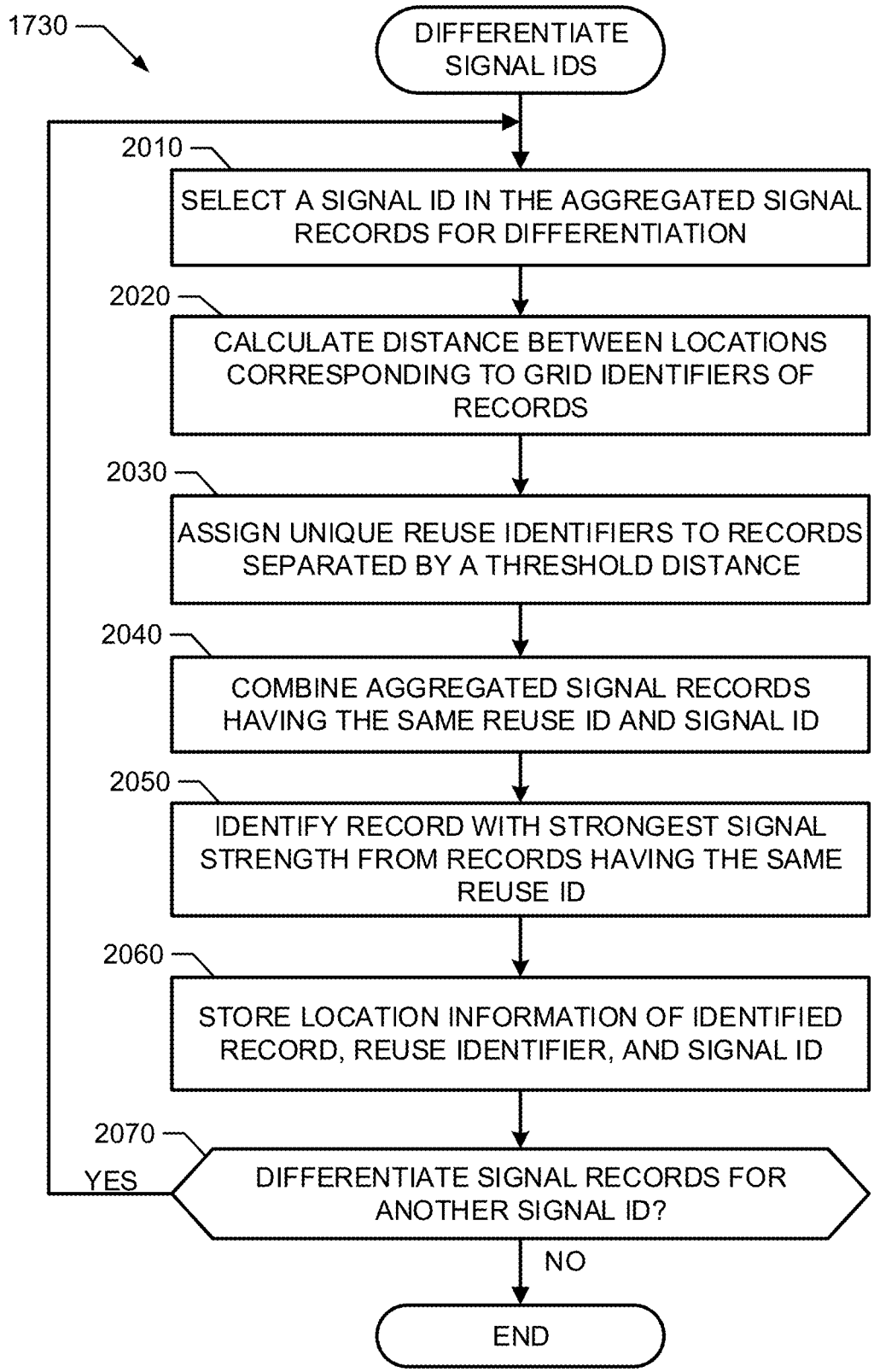
FIG. 20 is a flowchart representative of example machine readable instructions that may be executed to implement the example signal differentiator of FIG. 8.

A flowchart representative of example machine readable instructions for implementing the signal differentiator 550 of FIG. 5 is shown in FIG. 20. In this example, the machine readable instructions comprise a program 1730 for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIG. 20, many other methods of implementing the example signal differentiator 550 of FIG. 5 may alternatively be used. For example, the order of execution of the blocks may be changed, and/or some of the blocks described may be changed, eliminated, or combined.

The program 1730 of FIG. 20, which may be executed to implement block 1730 of FIG. 17, begins at block 2010 with an initiation of the signal differentiator 550 of the base station locator 130 of FIG. 5 (e.g., completion of the program 1720). As explained below, the example program 1730 of FIG. 20 may repeat as needed to consider any number of signal IDs of interest.

At block 2010, the example aggregated signal ID selector 810 of FIG. 8 selects an aggregated signal ID of interest in the received signal records for differentiation to account for signal reuse. As explained below, the example program 1730 of FIG. 20 may repeat as needed to consider any number of signal IDs and/or aggregated signal records of interest.

At block 2020 of FIG. 20, the example reuse ID assigner 820 of FIG. 8 calculates a distance between sub-grid locations. The sub-grid locations are identified by location information in the aggregated signal records that have the selected signal ID. Based on the distance between the sub-grids (e.g., distances between the perimeters of the grids, centroids of the grids, etc.), the reuse ID assigner 820 assigns the same reuse ID to those aggregated signal records having locations within a threshold distance (e.g., 5 miles, 10 kilometers, etc.) and a different reuse ID to those aggregated signal records having location information outside of a threshold distance (block 2030).

The example signal record differentiator 830 of FIG. 8 identifies the aggregated signal records having the same signal ID and the same reuse ID and combines the record to generate a differentiated signal record corresponding to the reuse ID and signal ID (block 2040). In other words, while some signal records (and/or aggregated signal records) may have the same signal ID, because signals represented by such records were captured at locations that are a threshold distance from each other, the signal records are not likely associated with the same base station. Accordingly, the aggregated signal records with the same signal ID having location information outside of the threshold distance from one another are not to be combined. Keeping these records separate preserves a sample location point (e.g., the location where the greatest signal quality was received) for the corresponding signal ID at each of the corresponding reuse areas for the respective records having the same signal ID. At block 2050, the example signal quality analyzer 840 identifies the greatest signal quality value from the aggregated signal records combined into the differentiated signal record to provide a more accurate sample location point relative to the aggregated signal records indicating that a lower signal quality was measured. The signal quality analyzer 840 then stores the location information where the greatest signal quality value for the signal ID was attained within the reuse ID range (e.g., within a 5 kilometer radius) (block 2060).

At block 2070, the example signal differentiator 550 of FIGS. 5 and/or 8 determines whether there are more aggregated signal records that are to be differentiated. If more signal records are to be differentiated (e.g., not all aggregated signal records have been assigned a reuse ID), then control returns to block 2010. If there are no more aggregated signal IDs that are to be differentiated (e.g., all aggregated signal records have been differentiated or all aggregated signal records have been assigned a reuse ID), then the program 1730 of FIG. 20 ends.

Figure 21:
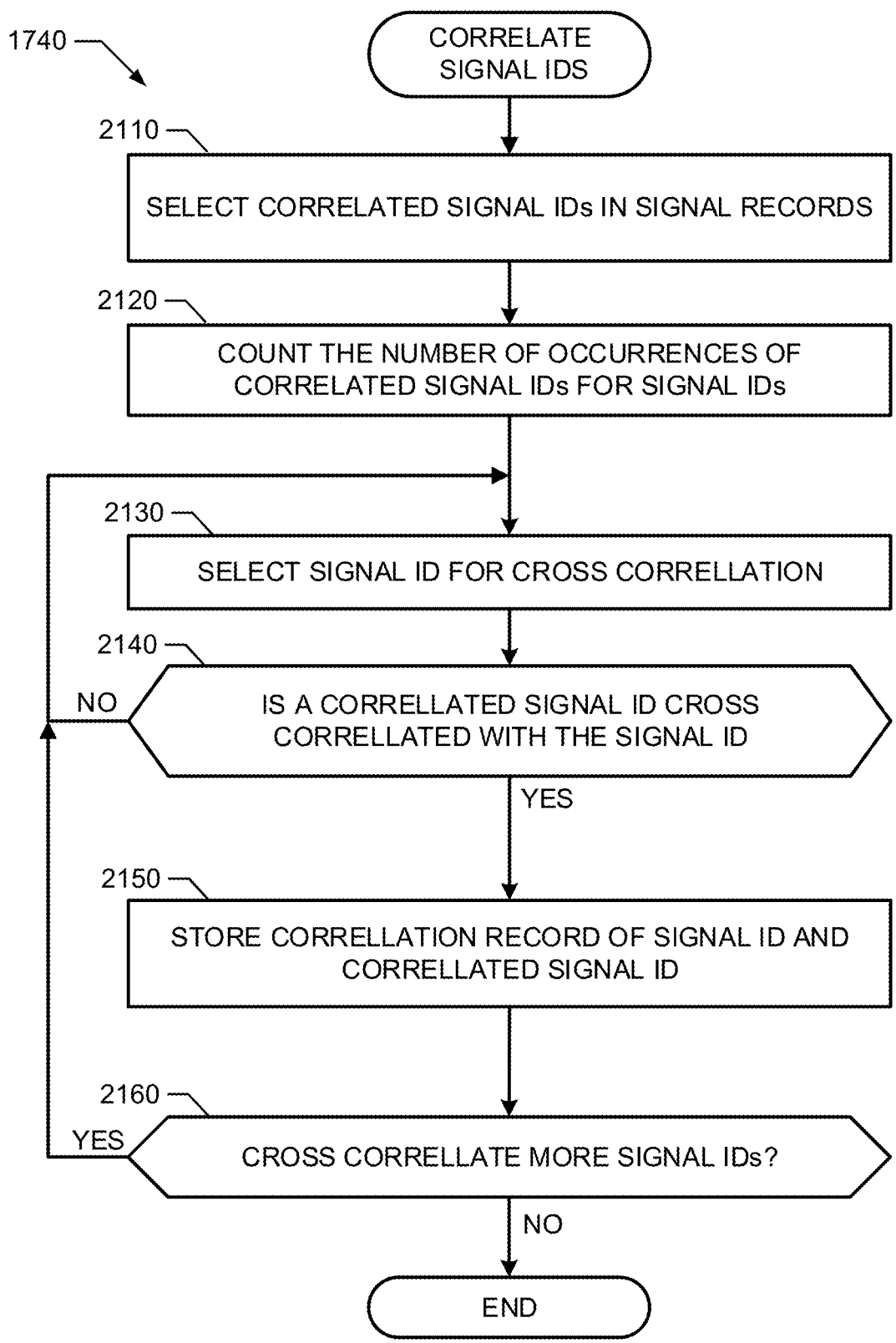
FIG. 21 is a flowchart representative of example machine readable instructions that may be executed to implement the example signal correlator of FIG. 10.

A flowchart representative of example machine readable instructions for implementing the signal correlator 560 of FIG. 5 is shown in FIG. 21. In this example, the machine readable instructions comprise a program 1740 for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIG. 21, many other methods of implementing the example signal correlator 560 of FIG. 5 may alternatively be used. For example, the order of execution of the blocks may be changed, and/or some of the blocks described may be changed, eliminated, or combined.

The program 1740 of FIG. 21, which may be executed to implement block 1740 of FIG. 17, begins at block 2110 with an initiation of the signal correlator 560 of FIG. 5 and/or 10 (e.g., completion of the program 1720, or initiation of the base station locator 130). As explained below, the example program 1740 of FIG. 21 may repeat as needed to consider any number of associated and/or correlated signal IDs of interest.

At block 2110, the example signal ID correlator 1010 of FIG. 10 selects associated signal IDs of interest (e.g., identified in signal records and/or correlation records based on proximity, location, time of receipt, potential neighbor signal information) in the signal records of the signal record database 530. In some examples, the example signal ID correlator 1010 generates a correlation database identifying the correlated signal records (e.g., two signal records including signal IDs represent signals that referred to each other and/or were received at one or more of the same time and/or location). In some examples, the signal ID correlator 1010 retrieves correlated signal information generated by the signal receiver 110 of FIGS. 1 and/or 3 and stored in the signal record database. For example, the signal IDs are correlated based on whether they are listed in a correlation records of a signal record and/or were received, captured, and/or measured at or about the same time and/or location.

At block 2120 of FIG. 21, the example correlation counter 1020 of FIG. 10 determines which signal IDs are correlated with one another and the number of occurrences of a corresponding parent/child relationship for selected parent IDs (e.g., as illustrated by the correlated signal count 1118 in FIG. 11). The correlation counter 1020 selects a parent signal ID for analysis to determine which signals are correlated with the parent signal ID. A signal ID is identified as a child signal ID if a signal represented by the signal ID was received, captured, or measured at or about the same time and/or location of a signal represented by the parent signal ID. The correlation counter 1020 lists the child signal IDs for the selected parent ID. Furthermore, at block 2120, the correlation counter 1020 counts a number of signal records indicating that a first signal ID is correlated with a second signal ID.

At block 2130, the example cross correlator 1030 of FIG. 10 selects a parent signal ID for cross correlation. The cross correlator 1030 determines whether a child signal ID (from the counted correlated signal records) is cross correlated (e.g., identified as a parent signal ID in a correlation record having the selected parent ID as a child signal ID) with the selected parent signal ID (block 2140). More specifically at block 2140, the cross correlator 1030 determines whether any signal records indicate that a child signal ID (identified as being correlated with the parent signal ID) is correlated with the parent signal ID. In other words, the parent signal ID and child signal ID refer back to each other (e.g., they include reciprocating references to each other) as a child signal ID and parent signal ID, respectively. Thus, if, at block 2140, the cross correlator 1030 determines that the signals are not cross correlated, control returns to block 2130. If the cross correlator 1030 determines the signal IDs (i.e., the selected parent signal ID and a child signal ID) are cross correlated, control advances to block 2150.

At block 2150, the example cross correlator 1030 stores correlation records identifying the signal IDs are associated with one another, representing that the signal IDs are likely transmitted from one or more base stations in the same area.

In some examples, the example cross correlator 1030 of FIG. 10 may store a count of the number of cross correlated signal IDs. The count of the number of cross correlations may be used to identify those signal IDs having a higher likelihood of coming from a same base station or a same area of one or more base stations. Accordingly, the signal localizer 570 of FIG. 5 and/or 10 may use such information to analyze, as described below, those signal IDs having a higher likelihood of being transmitted from the same base station or one or more base stations from a same area before analyzing other signal IDs to increase processing efficiency of the data collector 120. Processing efficiency may be increased because once a threshold number of signal IDs (e.g., three, six, etc.) are determined to be transmitted from the same base station, the signal localizer 570 may disregard any remaining cross correlated signal IDs as being representative of signals transmitted from other base stations.

At block 2160, the example signal correlator 560 determines whether there are more signals IDs in the signal records that are to be cross correlated. If more signal records are to be cross correlated (e.g., not all cross correlation counts have been performed), then control returns to block 2130. If there are no more signal IDs that are to be cross correlated (e.g., cross correlation counts have been stored for all signal IDs), then the program 1740 of FIG. 21 ends.

Figure 22:
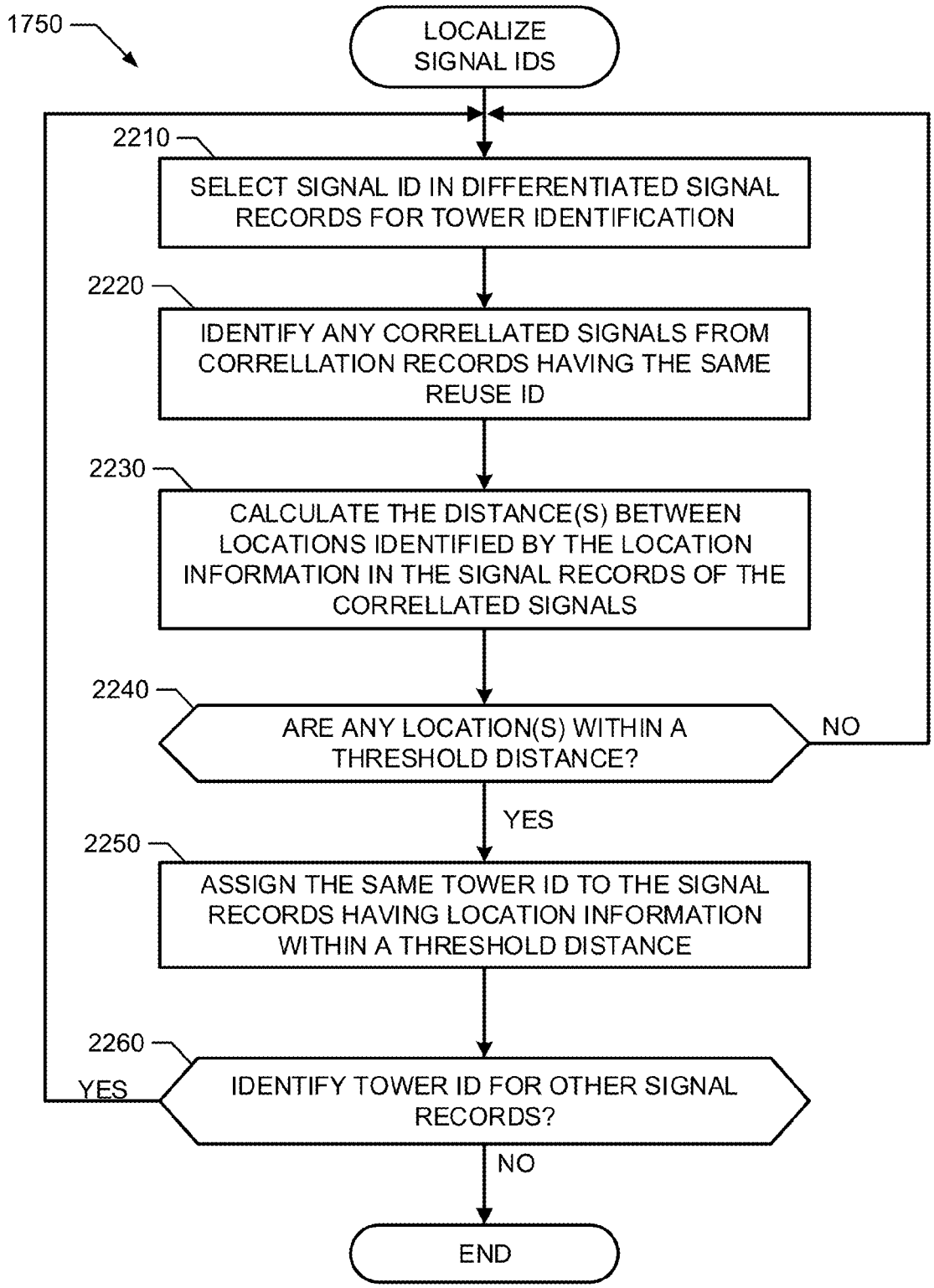
FIG. 22 is a flowchart representative of example machine readable instructions that may be executed to implement the example signal localizer of FIG. 12.

A flowchart representative of example machine readable instructions for implementing the signal localizer 570 of FIG. 5 is shown in FIG. 22. In this example, the machine readable instructions comprise a program 1750 for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIG. 22, many other methods of implementing the example signal localizer 570 of FIG. 5 may alternatively be used. For example, the order of execution of the blocks may be changed, and/or some of the blocks described may be changed, eliminated, or combined.

The program 1750 of FIG. 22, which may be executed to implement block 1750 of FIG. 17, begins at block 2210 with an initiation of the signal localizer 570 of the base station locator 130 of FIG. 5 (e.g., after completion of the programs 1730, 1740). As explained below, the example program 1750 of FIG. 22 may repeat as needed to consider any number of signal IDs of interest.

At block 2210, the example differentiated signal record identifier 1210 of FIG. 12 selects a signal ID of interest in the differentiated signal records (e.g., records resulting from the differentiation in the program 1730) of the signal record database 530. At block 2220, the correlation record identifier 1220 of FIG. 12 identifies the correlated signal IDs of the selected signal ID from the differentiation records in the correlation records (e.g., records resulting from the cross correlation in the program 1740).

At block 2230, the example tower ID assigner 1230 of FIG. 12 calculates a distance between the locations corresponding to where greatest signal quality was received for signals represented by the correlated signal IDs from the differentiated signal records. At block 2240, if the locations of the correlated signal IDs are within a threshold distance (e.g., 250 meters), which may be determined by a user-defined threshold, control advances to block 2250. If, at block 2240, the tower ID assigner 1230 determines that none of the signal records include location information within a threshold distance, control returns to block 2210.

At block 2250 of FIG. 22, the tower ID assigner 1230 assigns a unique signal ID to the correlated signal records having location information within the threshold distance. Accordingly, the tower ID assigner 1230 assigns a tower ID to represent that the signals represented by signals IDs with the same tower ID were transmitted from one or more transmitter of the same base station. As described above, the transmitters of the base station may directionally transmit signals toward sectors of a cell of the base station. Accordingly the signal IDs may correspond to the signal transmitted to the respective cells. In some examples, signal IDs for a particular area are removed or deleted from correlation records in the signal record database 530. For example, once a tower ID is assigned to a signal ID, references to the signal ID may be removed from the correlation records of a particular area.

At block 2260, the signal localizer 570 determines whether there are more signal records that are to be assigned tower IDs. If more signal records are to be assigned tower IDs, then control returns to block 2210. If the signal localizer 570 is not to assign tower IDs for any other signal records (e.g., all signal records have been assigned tower IDs), then the program 1750 ends.

Figure 23:
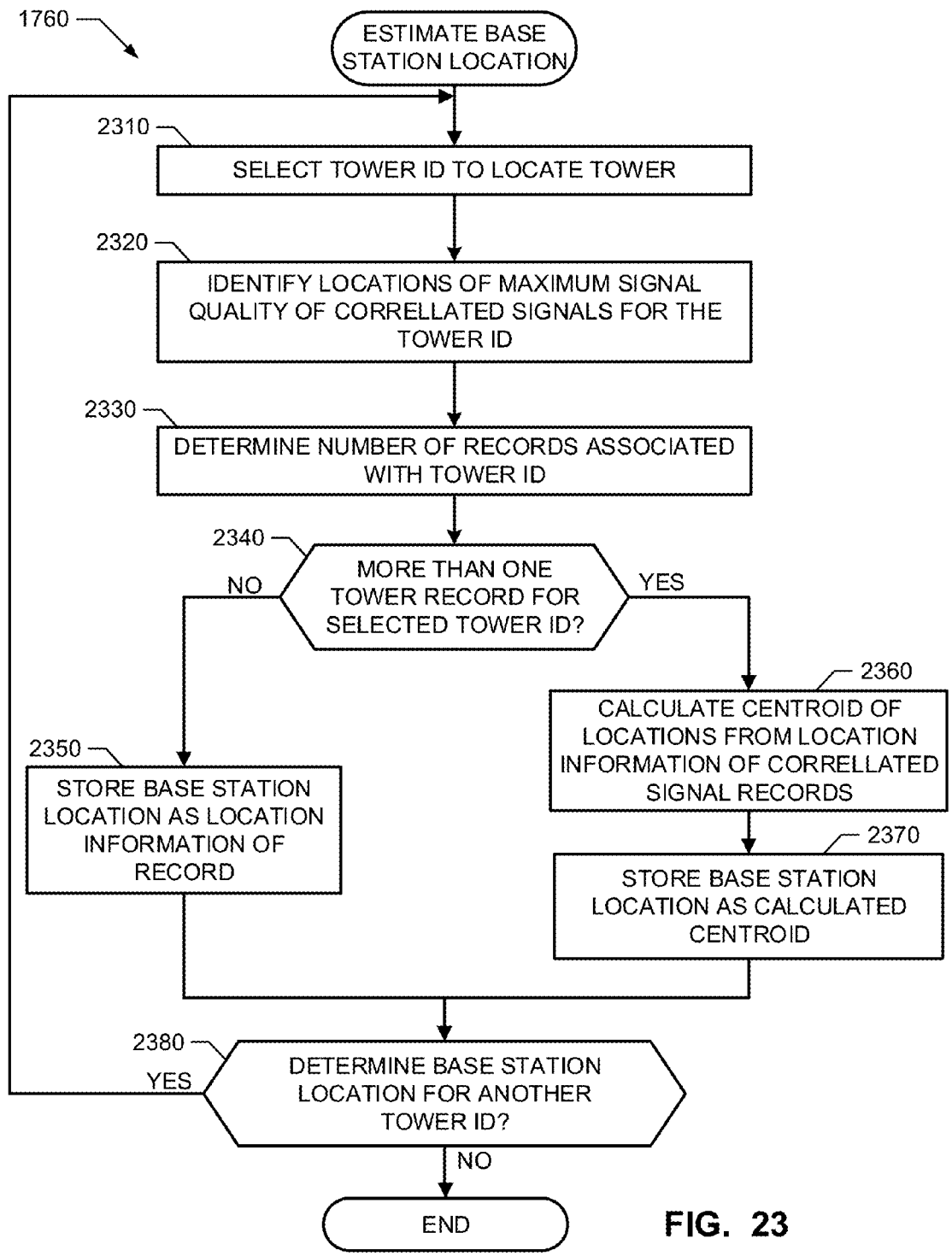
FIG. 23 is a flowchart representative of example machine readable instructions that may be executed to implement the example base station location estimator of FIG. 14.

A flowchart representative of example machine readable instructions for implementing the base station location estimator 580 of FIG. 5 is shown in FIG. 23. In this example, the machine readable instructions comprise a program 1760 for execution by a processor such as the processor 2412 shown in the example processor platform 2400 discussed below in connection with FIG. 24. The program may be embodied in software stored on a tangible computer readable storage medium such as a CD-ROM, a floppy disk, a hard drive, a digital versatile disk (DVD), a Blu-ray disk, or a memory associated with the processor 2412, but the entire program and/or parts thereof could alternatively be executed by a device other than the processor 2412 and/or embodied in firmware or dedicated hardware. Further, although the example program is described with reference to the flowchart illustrated in FIG. 23, many other methods of implementing the example base station location estimator 580 of FIG. 5 may alternatively be used. For example, the order of execution of the blocks may be changed, and/or some of the blocks described may be changed, eliminated, or combined.

The program 1760 of FIG. 23, which may be executed to implement block 1760 of FIG. 17, begins at block 2310 with an initiation of the base station location estimator 580 of the base station locator 130 of FIG. 5 (e.g., after completion of the programs 1750). As explained below, the example program 1760 of FIG. 23 may repeat as needed to consider any number of tower IDs of interest.

At block 2310, the tower ID selector 1410 of FIG. 14 selects a tower ID of interest in the tower records (e.g., records resulting from the tower ID assignment in the program 1750) of the signal record database 530. At block 2320 of FIG. 23, the 1544 1420 identifies the location information from the tower records for a particular tower corresponding to the locations where the greatest signal quality was received for the respective signal IDs. The tower location calculator 1430, at block 2330, determines the number of tower records having the selected tower ID. If, at block 2340, the tower location calculator 1430 determines that there is not more than one record having the selected tower ID, control advances to block 2350. At block 2350, the tower location calculator 1430 stores the base station location for the selected tower ID (e.g., the base station location coordinates 1522) as the location of where the greatest signal quality was received for the signal represented by the signal ID identified in the corresponding differentiated signal record for the selected tower ID.

If the tower location calculator 1430 determines that there is more than one tower record for the selected tower ID (block 2340) control advances to block 2360. At block 2360, the tower location calculator 1430 calculates the centroid (e.g., a mid-point between two records, or center of a triangle, polygon, etc. formed from the location coordinates, etc.) of the locations identified by the location information of the differentiated signal records. At block 2370, the tower location calculator 1430 stores the calculated centroid as the base station location in the signal record database 530 or other database associated with the data collector 120.

After block 2350 or block 2370, control advances to block 2380 of FIG. 23. At block 2380, the base station location estimator 580 determines whether there are more base station locations to be estimated. If more base station locations are to be estimated (e.g., not all tower IDs have had a location estimated), then control returns to block 2310. If the base station location estimator 580 is not to estimate a base station location for any other tower IDs (e.g., a location has been estimated for all tower IDs), then the program 1760 ends.

As mentioned above, one or more of the example processes of FIGS. 17-23 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 17-23 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 24:
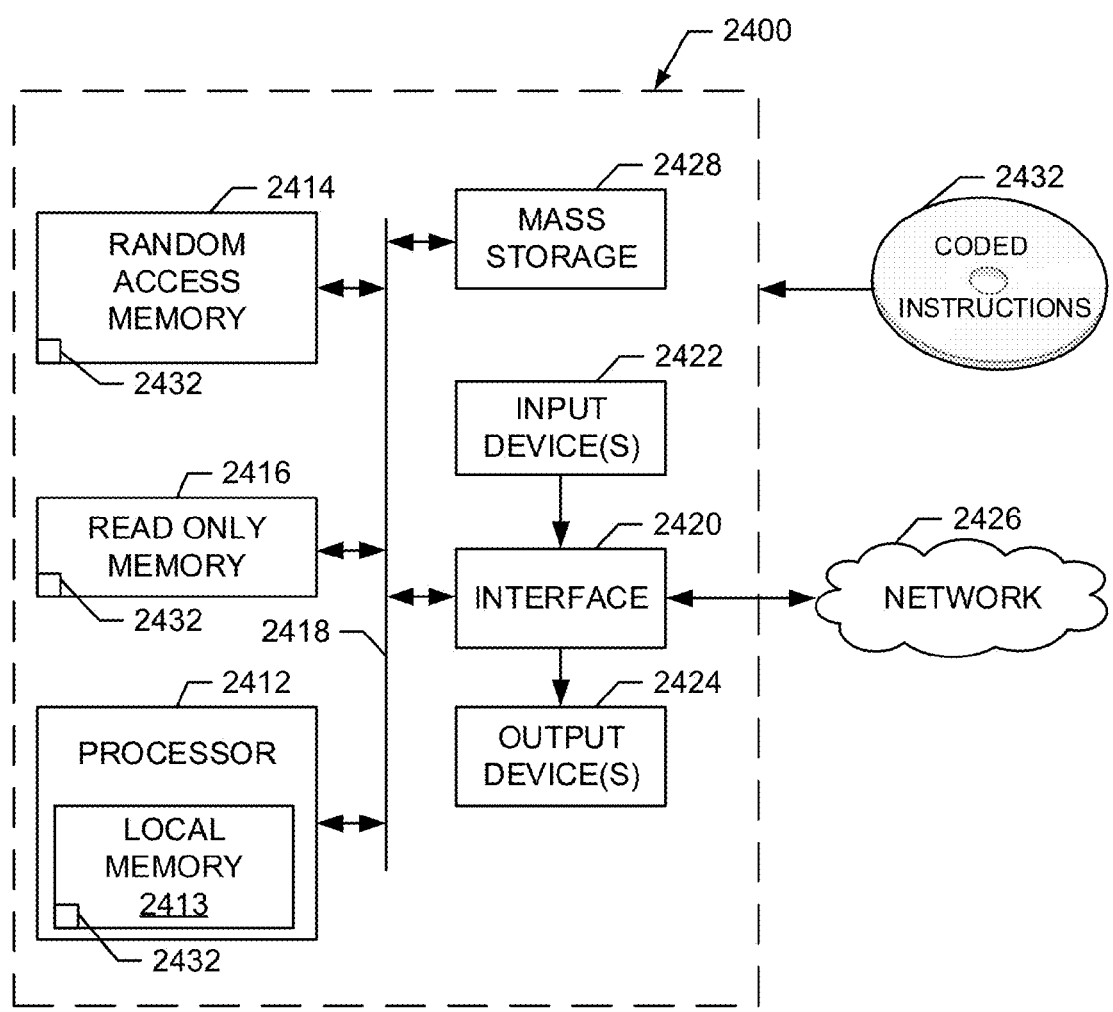
FIG. 24 is a block diagram of an example processing platform capable of executing the machine readable instructions of FIGS. 17-22 and/or 23 to implement the example signal receiver of FIGS. 1 and/or 3 and/or the data collector of FIGS. 1 and/or 5.

FIG. 24 is a block diagram of an example processor platform 1000 capable of executing the instructions of FIGS. 17-23 to implement the signal receiver 110 and/or the data collector 120 of FIG. 1. The processor platform 2400 can be, for example, a server, a personal computer, a mobile device (e.g., a cell phone, a smart phone, a tablet such as an iPad™), a personal digital assistant (PDA), an Internet appliance, or any other type of computing device.

The processor platform 2400 of the illustrated example includes a processor 2412. The processor 1012 of the illustrated example is hardware. For example, the processor 2412 can be implemented by one or more integrated circuits, logic circuits, microprocessors or controllers from any desired family or manufacturer.

The processor 2412 of the illustrated example includes a local memory 2413 (e.g., a cache). The processor 2412 of the illustrated example is in communication with a main memory including a volatile memory 2414 and a non-volatile memory 2416 via a bus 2418. The volatile memory 2414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2416 may be implemented by flash memory and/or any other desired type of memory device. Access to the main memory 2414, 2416 is controlled by a memory controller.

The processor platform 2400 of the illustrated example also includes an interface circuit 2420. The interface circuit 2420 may be implemented by any type of interface standard, such as an Ethernet interface, a universal serial bus (USB), and/or a PCI express interface.

In the illustrated example, one or more input devices 2422 are connected to the interface circuit 2420. The input device(s) 2422 permit(s) a user to enter data and commands into the processor 2412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2424 are also connected to the interface circuit 2420 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2420 of the illustrated example, thus, typically includes a graphics driver card, a graphics driver chip or a graphics driver processor.

The interface circuit 2420 of the illustrated example also includes a communication device such as a transmitter, a receiver, a transceiver, a modem and/or network interface card to facilitate exchange of data with external machines (e.g., computing devices of any kind) via a network 2426 (e.g., an Ethernet connection, a digital subscriber line (DSL), a telephone line, coaxial cable, a cellular telephone system, etc.).

The processor platform 2400 of the illustrated example also includes one or more mass storage devices 2428 for storing software and/or data. Examples of such mass storage devices 2428 include floppy disk drives, hard drive disks, compact disk drives, Blu-ray disk drives, RAID systems, and digital versatile disk (DVD) drives.

The coded instructions 2432 of FIGS. 17-23 may be stored in the mass storage device 2428, in the volatile memory 2414, in the non-volatile memory 2416, and/or on a removable tangible computer readable storage medium such as a CD or DVD.

From the foregoing, it will be appreciated that example disclosed methods, apparatus, and articles of manufacture disclosed herein identify that signals are transmitted from a single base station and calculate the base station location of the base station transmitting the corresponding signals based on signal quality and/or signal strength measurements (e.g., during a drive test) of the associated signals. In some such examples, a greatest signal strength measurement and corresponding location are determined by processing a plurality of signal records using an aggregation method and a differentiation method. In some such examples, identification of the base stations enables a user (e.g., a measurement entity such as The Nielsen Company (US), LLC, a wireless network provider and/or a third party) to determine a distribution of the base stations and its effects on wireless network coverage and/or quality of service.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer-implemented method to estimate a location of a base station comprising:
   determining which signals are transmitted from a first base station by:
      identifying a first set of signals having a first signal identifier;
      identifying a first signal in the first set of signals having a first relative highest signal quality value;
      identifying a first location associated with the first signal;
      identifying a second set of signals having a second signal identifier;
      identifying a second signal in the second set of signals having a second relative highest signal quality value;
      identifying a second location associated with the second signal;
      determining a first distance between the first location and the second location;
      comparing the first distance to a first threshold distance; and
      associating the first signal and the second signal with the first base station when the first distance satisfies the first threshold distance; and
   estimating a location of the first base station based on at least one of the first location or the second location.

2. A method as defined in claim 1, wherein the estimating of the location of the first base station includes determining the location of the first base station as a centroid of the first and second locations.

3. A method as defined in claim 1, wherein the first distance satisfies the first threshold distance when the first distance does not exceed the first threshold distance.

4. A method as defined in claim 1, further including distinguishing signals from a plurality of base stations that reuse a same signal identifier by:
   identifying a third set of signals having the first signal identifier;
   identifying a third signal in the third set of signals having a third relative highest signal quality value;
   identifying a third location associated with the third signal;
   determining a second distance between the first location and the third location;
   comparing the second distance to a second threshold distance, the second threshold distance greater than the first threshold distance;
   associating a same region identifier to the first signal and the third signal when the second distance satisfies the second threshold distance; and
   associating different region identifiers to the first and third signals when the second distance does not satisfy the second threshold distance.

5. A method as defined in claim 1, further including:
   identifying a third set of signals having a third signal identifier and the first base station identifier;
   identifying a third signal in the third set of signals having a third relative highest signal quality value;
   identifying a third location associated with the third signal;
   determining a second distance between the first location and the third location;
   comparing the second distance to the first threshold distance; and
   associating the third signal with the first base station when the second distance satisfies the first threshold distance.

6. A method as defined in claim 5, wherein the estimating of the location of the first base station includes determining the location of the first base station as a centroid of the first, second, and third locations.

7. A method as defined in claim 5, further including:
   determining a third distance between the second location and the third location;
   comparing the third distance to the first threshold distance; and
   associating the third signal with the first base station when the third distance satisfies the first threshold distance.

8. An apparatus to estimate a location of a base station comprising:
   a signal analyzer to:
      identify a first set of signals having a first signal identifier;
      identify a first signal in the first set of signals having a first relative highest signal quality value;
      identify a second set of signals having a second signal identifier; and
      identify a second signal in the second set of signals having a second relative highest signal quality value;
   a signal localizer to:
      identify a first location associated with the first signal;
      identify a second location associated with the second signal;

determine a first distance between the first location and the second location; and compare the first distance to a threshold distance;

a tower identification assigner to associate the first signal and the second signal with a first base station when the first distance satisfies the first threshold distance; and a base station estimator to estimate a location of the first base station based on at least one of the first location or the second location.

9. An apparatus as defined in claim 8, wherein the base station estimator is to estimate the location of the first base station as a centroid of the first and second locations.

10. An apparatus as defined in claim 8, wherein the first distance satisfies the first threshold distance when the first distance does not exceed the first threshold distance.

11. An apparatus as defined in claim 8, wherein the signal analyzer is to identify a third set of signals having the first signal identifier, a third signal in the third set of signals having a third relative highest signal quality value, further including:

a reuse identification assigner to:

identify a third location associated with the third signal;

determine a second distance between the first location and the third location;

compare the second distance to a second threshold distance;

associate a same region identifier to the first signal and the third signal when the second distance satisfies the second threshold distance; and associate different region identifiers to the first and third signals when the second distance does not satisfy the second threshold distance.

12. An apparatus as defined in claim 8, wherein the signal analyzer is to:

identify a third set of signals having a third signal identifier;

identify a third signal in the third set of signals having a third relative highest signal quality value;

identify a third location associated with the third signal;

determine a second distance between the first location and the third location;

compare the second distance to the first threshold distance; and associate the third signal with the first base station when the second distance satisfies the first threshold distance.

13. An apparatus as defined in claim 12, wherein the base station estimator is to estimate the location of the first base station as a centroid of the first, second, and third locations.

14. A tangible machine readable storage medium comprising instructions that, when executed, cause a machine to at least:

identify a first set of signals having a first signal identifier;

identify a first signal in the first set of signals having a first relative highest signal quality value;

identify a first location associated with the first signal;

identify a second set of signals having a second signal identifier;

identify a second signal in the second set of signals having a second relative highest signal quality value;

identify a second location associated with the second signal;

determine a first distance between the first location and the second location;

compare the first distance to a first threshold distance;

associate the first signal and the second signal with a first base station when the first distance satisfies the first threshold distance; and estimate a location of the first base station based on at least one of the first location or the second location.

15. A storage medium according to claim 14, wherein the instructions, when executed, further cause the machine to estimate the location of the first base station as a centroid of the first and second locations.

16. A storage medium according to claim 14, wherein the instructions, when executed, further cause the machine to estimate the location of the first base station as being one of the first location or the second location.

17. A storage medium according to claim 14, wherein the first distance satisfies the first threshold distance when the first distance does not exceed the first threshold distance.

18. A storage medium according to claim 14, wherein the instructions, when executed, further cause the machine to:

identify a third set of signals having the first signal identifier;

identify a third signal in the third set of signals having a third relative highest signal quality value;

identify a third location associated with the third signal;

determine a second distance between the first location and the third location;

compare the second distance to a second threshold distance;

associate a same region identifier to the first signal and the third signal when the second distance satisfies the second threshold distance; and associate different region identifiers to the first and third signals when the second distance does not satisfy the second threshold distance.

19. A storage medium according to claim 14, wherein the instructions, when executed, further cause the machine to:

identify a third set of signals having a third signal identifier;

identify a third signal in the third set of signals having a third relative highest signal quality value;

identify a third location associated with the third signal;

determine a second distance between the first location and the third location;

compare the second distance to the first threshold distance; and associate the third signal with the first base station when the second distance satisfies the first threshold distance.

20. A storage medium according to claim 19, wherein the instructions, when executed, further cause the machine to estimate the location of the first base station as a centroid of the first, second, and third locations.

* * * * *